US005965994A

United States Patent [19]

Seo

[11] Patent Number: 5,965,994

[45] Date of Patent: Oct. 12, 1999

[54] AUTOMATIC VERTICAL MOVING SYSTEMS AND CONTROL METHODS THEREFOR

[76] Inventor: Dong Il Seo, 508-304 Expo Apt., Jeonmin-dong, Yusung-gu, Taejon 305-390, Rep. of Korea

[21] Appl. No.: 09/037,509

[22] Filed: Mar. 10, 1998

[30] Foreign Application Priority Data

| | | | |
|---|---|---|---|
| Jun. 20, 1997 | [KR] | Rep. of Korea | 97-26192 |
| Jun. 20, 1997 | [KR] | Rep. of Korea | 97-26193 |
| Jun. 20, 1997 | [KR] | Rep. of Korea | 97-26194 |
| Jun. 20, 1997 | [KR] | Rep. of Korea | 97-26195 |
| Jun. 20, 1997 | [KR] | Rep. of Korea | 97-26196 |

[51] Int. Cl.[6] .......... H02P 1/00

[52] U.S. Cl. .......... 318/280; 318/283; 212/307

[58] Field of Search .......... 318/3, 6, 9–10, 318/280, 282, 283; 212/307, 284, 309, 310

[56] References Cited

U.S. PATENT DOCUMENTS

| | | | |
|---|---|---|---|
| 3,871,527 | 3/1975 | Schimmeyer | 212/3 |
| 3,965,404 | 6/1976 | Petersen | 318/377 |
| 4,155,538 | 5/1979 | Claassen | 254/172 |
| 4,354,608 | 10/1982 | Wudtke | 212/191 |
| 5,542,811 | 8/1996 | Vartanian | 414/541 |

*Primary Examiner*—Robert E. Nappi
*Assistant Examiner*—Rina I. Duda
*Attorney, Agent, or Firm*—Larson & Taylor

[57] ABSTRACT

Disclosed are automatic vertical moving systems and control methods therefor for regularly lowering an object with predetermined depth and time intervals to a desired maximum depth in water and then raising it to the surface of water to analyze vertical changes of water quality in lakes and reservoirs continuously, comprising a barge for floating on the surface of the water so as to be retained at a desired position thereon, a winch mounted on the barge, rotatable in opposite directions to lower and raise the object and provided with a wire rope wound and rewound around the winch according to the rotational directions, the wire rope being connected at its free end to the object, an electric motor connected to the winch for rotating in opposite directions, and a motor controller for controlling the motor to be regularly activated and deactivated and to be changed in rotational directions thereof. Also, an assistant line may be further included to prevent entanglement of the wire rope and possible loss of the object due to external impact of unusual matters in water.

18 Claims, 17 Drawing Sheets

AUTOMATIC VERTICAL MOVING SYSTEMS AND CONTROL METHODS THEREFOR

BACKGROUND OF THE INVENTION

1. Field of the Invention

The present invention relates generally to automatic vertical moving systems and control methods therefor, and more particularly to automatic vertical moving systems and control methods therefor for regularly lowering an object with predetermined depth and time intervals to a desired maximum depth in water and then raising it to the surface of water.

2. General Background

Recently, automatic water quality analysis system with associated internal memory, such as YSI6000 from YSI Inc., U.S.A. became commercially available to monitor water quality in lakes, reservoirs, rivers and coastal areas. The analysis system is generally provided with sensors for automatically measuring water temperature, dissolved oxygen concentration, conductivity, pH, salinity, turbidity, oxidation reduction potential, and etc., and built-in memory to store data collected during operation.

The analysis system, however, has no moving capability. So, for observing the vertical changes of the water quality, especially in lakes and reservoirs, the system should be lowered and raised manually, which takes a long time and is inefficient to acquire the desired data.

SUMMARY OF THE INVENTION

It is therefore an object of this invention to provide an automatic vertical moving system for vertically moving an object such as an automatic water quality analysis system or automatic water quality sensors that can monitor water quality, continuously.

Another object of this invention is to provide an automatic vertical moving system and a control method therefor for lowering the object with predetermined depth and time intervals until the object reaches a desired maximum depth and for raising the object to a predetermined level near the surface of water, in order to analyze the vertical changes of water quality in lakes and reservoirs continuously.

Still another object of the invention is to provide an automatic vertical moving system and a control method thereof for lowering the object with predetermined depth and time intervals to a desired maximum depth and raising the object, wherein the object is automatically raised by a reset signal caused from hardware or software when errors occur during the execution of a control program in the moving system so that the moving system can be restarted. Moreover, when repeated resets are executed by fatal errors caused from outside or inside of the moving system such as mis-working of a motor, entangled wire rope, or impact due to unusual matters drifting in water, electric power supply to the moving system is shut down to stop and protect the moving system.

Still another object of the invention is to provide an automatic vertical moving system and a control method therefor wherein entanglement of a wire rope at the end of which the object is suspended can be avoided, and also possible missing of the object due to external impact of unusual matters in water that may result in cutting off of the wire rope can be avoided, by applying tension to the wire rope by means of an assistant line and an weight means. Moreover, the assistant line can be replaced with a communication line with the object such as the automatic water quality analysis system to collect real time data therefrom.

To accomplish the objects of this invention, an automatic vertical moving system is provided in accordance with one aspect of the invention for vertically moving an object such as an automatic water quality analysis system or automatic water quality sensors that can monitor water quality, the moving system comprising:

a floating means such as a barge for floating on the surface of the water so as to be retained at a desired position thereon;

a winch means mounted on the floating means, rotatable in opposite directions to lower and raise the object, and provided with a wire rope wound and rewound around the winch means according to the rotational directions thereof, the wire rope being connected at its free end to the object; and a forward-and-backward rotation means for rotating the winch means with converting the rotational directions of the winch means between a forward direction to lower the object and a backward direction to raise the object.

The forward-and-backward rotation means may comprise an electric motor connected to the winch means for rotating in opposite directions; an electric power supply means for supplying electricity to the electric motor; and a motor control means for controlling the motor to be regularly activated and deactivated and to be changed in rotational directions thereof.

The motor control means may comprise a driving control means for switching the electric power supply means to the motor on and off; one or more timer means connected to the driving control means for switching the electric power supply means to the motor on to activate the motor at predetermined time intervals whenever the motor is deactivated; a plurality of guide rollers for guiding the wire rope to be wound and rewound steadily and for providing tension on the wire rope so that one of the guide rollers can not be rotated when the wire rope is loosened during the lowering; a counter means coupled with the one guide roller for detecting a rotational displacement thereof, and electrically connected to the driving control means for switching the motor off to deactivate the motor whenever the rotational displacement of the counter means is equal to a multiple of a predetermined rotational displacement during the lowering of the object and whenever the counter means is reset due to the raising of the object; and a direction control means connected to the counter means for converting the rotation direction of the motor when the rotational displacement of the counter means is not changed during the lowering of the object, thereby raising the object, and when the counter means is reset, thereby being capable of lowering the object after the predetermined suspending time interval by the timer means.

Also, the motor control means may comprise a detecting means for detecting the object when the object is raised to a predetermined level near the surface of the water, said detecting means having a limit switch connected to the driving control means for switching the motor off to deactivate the motor and connected to the direction control means so as to convert the rotational direction of the motor, thereby being capable of lowering the object after the predetermined suspending time interval by the timer means, and an operating means fixed on the wire rope at a predetermined position near its free end to operate the limit switch when the object is raised to the predetermined level.

The motor control means may comprise a control system instead of the timer means and the counter, which is connected to the driving control means for switching the electric power supply means to the motor off at predetermined depth time intervals corresponding to the predetermined unit depth and for switching the electric power supply means to the motor on at predetermined suspending time intervals, and connected to the direction control means for converting the rotational direction of the motor at a predetermined entire lowering time Td and at a predetermined pure raising time Tr, thereby repeatedly lowering and raising the object within a maximum depth corresponding to the predetermined pure raising time Tr and a rotational speed of the motor.

The driving control means may include a first driving switching means for switching the electric power supply means to the motor on and off, so that the motor is activated when the first driving switching means is switched on, and so that the motor is deactivated when the first driving switching means is switched off.

The direction control means may include a first and a second forward switching means and a first and a second backward switching means for switching the connection of the electric power supply means to the motor selectively between a first terminal and a second terminal of the motor so that the motor may be rotatable in the forward direction when the first and the second forward switching means are switched on and the motor may be rotatable in the backward direction when the first and the second backward switching means are switched on, and a first direction switching means and a second direction switching means for switching the first and second forward switching means and the first and second backward switching means on/off respectively and connected to each other in a manner interlocked to be switched on alternatively, thereby the first and the second forward switching means and the first and the second backward switching means being interlocked to be switched on alternatively.

The control system may comprise: a central processor processing interrupted signals from an internal timer to acquire data of a reference time Tc, executing a program to establish predetermined controls, and outputting a plurality of control signals to the driving and direction control means, the control signals comprising a first driving signal of HIGH/LOW for switching on/off the first driving switching means of the driving control means and a direction signal of HIGH/LOW for switching one of the first direction switching means and the second direction switching means on/off; and memory means storing the program for establishing predetermined controls and data generated during the execution of the program.

The moving system may further comprise a rotary encoder instead of the counter, which coupled with the one rotating guide roller for outputting electric signals corresponding to a rotational displacement thereof so that the central processor calculates a present depth Dc of the object in the water, which switches the motor off to deactivate the motor through the driving control means whenever the present depth Dc equals to a multiple of a predetermined unit depth Di instead of switching the electric power supply means to the motor off at the predetermined depth time intervals, and which converts the rotation direction of the motor through the direction control means when the electric signals are not outputted from the encoder during the lowering of the object and when the present depth Dc is a zero during the raising instead of converting the rotation direction of the motor at the predetermined pure raising time Tr, thereby iterating the lowering with the predetermined depth and suspending time intervals and the continuous raising of the object by using the electric signals from the encoder.

The driving control means further comprise a second driving switching means connected to the motor parallel with the first driving switching means so as to activate and deactivate the motor regardless of the first driving switching means, wherein the central processor outputs a second driving signal to the second driving switching means for activating the motor, and the direction signal to the direction switch means for converting the rotation direction of the motor at the predetermined level near the surface of the water instead of converting the rotation direction of the motor at the predetermined pure raising time Tr during the raising, thereby iterating the lowering with the predetermined depth and suspending time intervals and the continuous raising of the object by using the electric signals from the encoder and the limit switch.

The moving system may further comprise:

a reset means connected to the central processor to generate a reset signal to the central processor for automatically initiating the program when the reset means is enabled;

a program watch means connected to the central processor for supervising whether the central processor is operating normally by detecting a watchdog signal from the central processor by every predetermined time period, and connected to the reset means for enabling the reset means when the watchdog signal is not detected; and/or an input means connected to the control system for manually inputting predetermined external control signals and/or data to the control system and a display means connected to the control system for displaying predetermined data transferred from the control system, wherein the program executed by the central processor of the control system further comprises supervising the external control signals from the input means, transmitting data stored in the memory means according to the external control signals to the display means, and controlling the driving control means and the direction control means through the control system according to the external control signals.

The moving system may further comprises at least one assistant rope provided between the object and a fixed body such as bridge piers, the ground or other firmly fixed floating means in order to prevent the object from missing away in the case that the wire rope is cut; and at least one weight means movably and slidably suspended through a ring to the assistant rope, and the assistant line can be replaced with a communication line with the object such as the automatic water quality analysis system to collect real time data therefrom.

According to another aspect of the invention, there is a guarding device for a system from errors generated frequently, wherein the system comprises a processor performing a predetermined program, memory means storing the program and data generated during the program execution, and a reset means generating a reset signal for initiating the system whenever the error occurs, comprising:

a first guarding switching means connected to the reset means for outputting an amount of electric voltage by means of the reset signal;

a capacitor to be charged by means of the outputted electric voltage;

a resistor connected to the capacitor for slowly discharging the charge of the capacitor;

a second guarding switching means connected to the capacitor for being switched on when the voltage of the capacitor is charged beyond a predetermined voltage by means of reset signals generated more frequently than the predetermined number of times;

a first electromagnetic relay having a first solenoid coil energized when the second guarding switching means is switched on and a first changeover switching means which switches the supply passageway on when the first solenoid is deenergized and breaks the supply passageway when the first solenoid is energized;

a second electromagnetic relay having a second solenoid coil energized when the first changeover switching means switched the supply passage on and a second changeover switching means which switches the supply passageway off when said second solenoid coil is deenergized, thereby said second solenoid coil being maintained in the deenergized state once the first changeover switching means switches the supply passage off; and a start switch for energizing the second solenoid coil when the second solenoid coil is deenergized and the second changeover switching means switches the supply passageway off, thereby enabling the overall system to restart after the supply passageway is broken, wherein the guarding device is provided in the supply passageway into the overall system, and the guarding device is connected to the reset means for breaking the supply passageway when the reset means is enabled in more than the predetermined number of times.

According to still another aspect of the invention, there is a control method of an automatic vertical moving system for vertically lowering and raising an object such as an automatic water quality analysis system, wherein the moving system comprises: a floating means for securely floating on the water at a desired position; a winch means mounted on the floating means and provided with a wire rope connected at its free end to the object; a motor for driving the winch means in forward and backward directions selectively; a motor control means for controlling the motor in operation and direction; and a control system for controlling the motor control means, provided with a central processor executing a program and associated memory means storing the program and data generated during the program execution, the method comprising:

(a) a suspending step wherein the motor is deactivated to stop rotating for a predetermined suspending time for suspending the object at its vertical level and analyzing water quality;

(b) a lowering step wherein the motor is activated to rotate in the forward direction for lowering the object in a predetermined depth time corresponding to a predetermined depth;

(c) a first repeating step for repeatedly executing the suspending step and the lowering step for a predetermined entire lowering time Td for which the object reaches a predetermined maximum depth; and (d) a returning step wherein, at the predetermined maximum depth, the motor is activated to rotate in the backward direction for raising up the object to the surface position.

In the control method, where the moving system further comprises a rotary encoder coupled the at least one guide roller for outputting electric signals corresponding to the rotational displacement thereof and a detecting means for detecting the object being at the predetermined level near the surface of the water (that is, a surface position), the motor is maintained in the activated state by a predetermined unit depth interval Di until a present depth Dc obtained from the rotary encoder equals to a multiple of the predetermined unit depth interval Di, in the lowering step (b), and then the motor is deactivated for executing the suspending step (a).

Also, in the first repeating step (c), the suspending step (a) and the lowering step (b) is repeatedly executed until the present depth Dc equals to a predetermined maximum depth Dm; and in the returning step (d), when the present depth Dc is the predetermined maximum depth Dm, the motor is activated to rotate in the backward direction for raising up the object to the surface position until the detecting means is operated, the control method further comprising (e) an interrupting step, in which step, separately from the steps (a) to (d), the processor acquires interruptedly a reference time Tc and the present depth Dc by receiving pulse signals from an internal timer and the rotary encoder.

The control method may further comprise:

(f) an initiating step before the suspending step (a) in which the values of variables are initiated in the program, and the motor is activated in the backward direction for raising the object to the surface position when the detecting means does not detect the object;

(g) a second repeating step, after the returning step (d), for repeatedly executing the suspending step (a) and the first returning step (d), thereby automatically iterating the lowering of the object with the predetermined depth and suspending time intervals and the continuous raising of the object within the desired maximum depth;

(h) an external setting step wherein an input of an external setting signal from an input means is watched and the values of environment variables such as the predetermined unit time interval Ti, the predetermined unit depth interval Di and the maximum depth Dm are set or amended from the input means; and (i) an external control step wherein an input of external control signals from the input means is watched and the motor is controlled in operation and direction according to the external control signals.

The initiating step (f) may comprise the steps of: (1) setting the values of the variables of the reference time Tc and the present depth Dc to a value of zero; (2) activating the motor to rotate in the backward direction until the detecting means is switched on, and then, once the detecting means is switched on, the motor is activated to rotate in the forward direction until the detecting means is switched off for lowering the object just under the surface position, thereby deactivating the motor to stop rotating, and then the values of the present depth Dc and the reference time Tc is re-initiated by a zero; and (3) reading predetermined and stored value of environment variables of the predetermined unit depth interval Di, the predetermined unit time interval Ti and the predetermined maximum depth Dm.

The lowering step (b) may comprise the steps of: (4) comparing MOD (Dc/Di) with zero to determine whether the object is lowered by the predetermined unit depth interval Di after starting lowering; and (5) deactivating the motor through the motor control means for executing the suspending step (a) when MOD (Dc/Di) is a zero in step (4) and the reference time Tc is reset by a zero where the predetermined suspending time is given to the predetermined unit time interval Ti.

The suspending step (a) may comprise: (6) comparing MOD (Tc/Ti) with a zero to determine whether the predetermined suspending time has passed with the object maintained at the multiple depth of the predetermined unit depth interval Di where the total of the predetermined suspending time and the time corresponding to the predetermined unit depth interval Di is given to the predetermined unit time interval Ti; (7) comparing the predetermined unit time interval Ti with the reset reference time Tc at the deactivating step (5) to determine whether the predetermined suspending time has passed with the object maintained at the multiple depth of the predetermined unit depth interval Di where the predetermined suspending time is given to the predetermined unit time interval Ti; and (8) activating the motor in the forward direction through the motor control means for executing the lowering step (b) when MOD (Tc/Ti) is a zero in step (6) and when the predetermined unit time interval Ti is the reset reference time Tc in step (7).

The control method may further comprise:

(j) a timer error supervisory step wherein an old time To set by a zero at first and then replaced with the reference time Tc is compared with the reference time Tc during the execution of the program, the control system is reset if the reference time Tc is equal to the old time To, and the old time To is replaced with the reference time Tc if the reference time Tc is not equal to the old time To;

(K) an encoder error supervisory step wherein an encoder check time Te and an encoder check depth De respectively to be set to a value of zero at first and then to be replaced with the reference time Tc and the present depth Dc are respectively compared with the reference time Tc and the present depth Dc during the lowering or the raising of the object in a predetermined check time after the setting and the replacing, the electric power supply for the overall moving system is shut off if the present depth Dc is equal to, or greater than, the encoder check depth De during the raising and if the present depth Dc is equal to, or smaller than, the encoder check depth De during the lowering, and the encoder check time Te and the encoder check depth De are replaced with the reference time Tc and the present depth Dc respectively; and/or (l) a missing supervisory step wherein, when the present depth Dc is equal to, or smaller than, the encoder check depth De during the lowering in the encoder error supervisory step (k), the encoder check depth De is replaced with the present depth Dc instead of shutting off the electric power supply, the motor is activated to rotate in the backward direction for raising the object, the present depth Dc is compared with the encoder check depth De in a predetermined missing check time after the motor is activated to rotate in the backward direction, the motor is continuously activated to rotate in the backward direction for raising the object if the present depth Dc is smaller than the encoder check depth De, and, if the present depth Dc is equal to, or greater than the encoder check depth De, an alarm signal is outputted to at least one external alarm means supplied by a separated electric power source and then the electric power supply for the control system is shut off.

BRIEF DESCRIPTION OF THE DRAWINGS

For a further understanding of the nature and objects of the present invention reference should be had to the following description, taken in conjunction with the accompanying drawing in which like parts are given like reference numerals, and wherein.

DETAILED DESCRIPTION OF THE PREFERRED EMBODIMENT

The invention will now be described by way of example with reference to the accompanying drawings.

Figure 1:
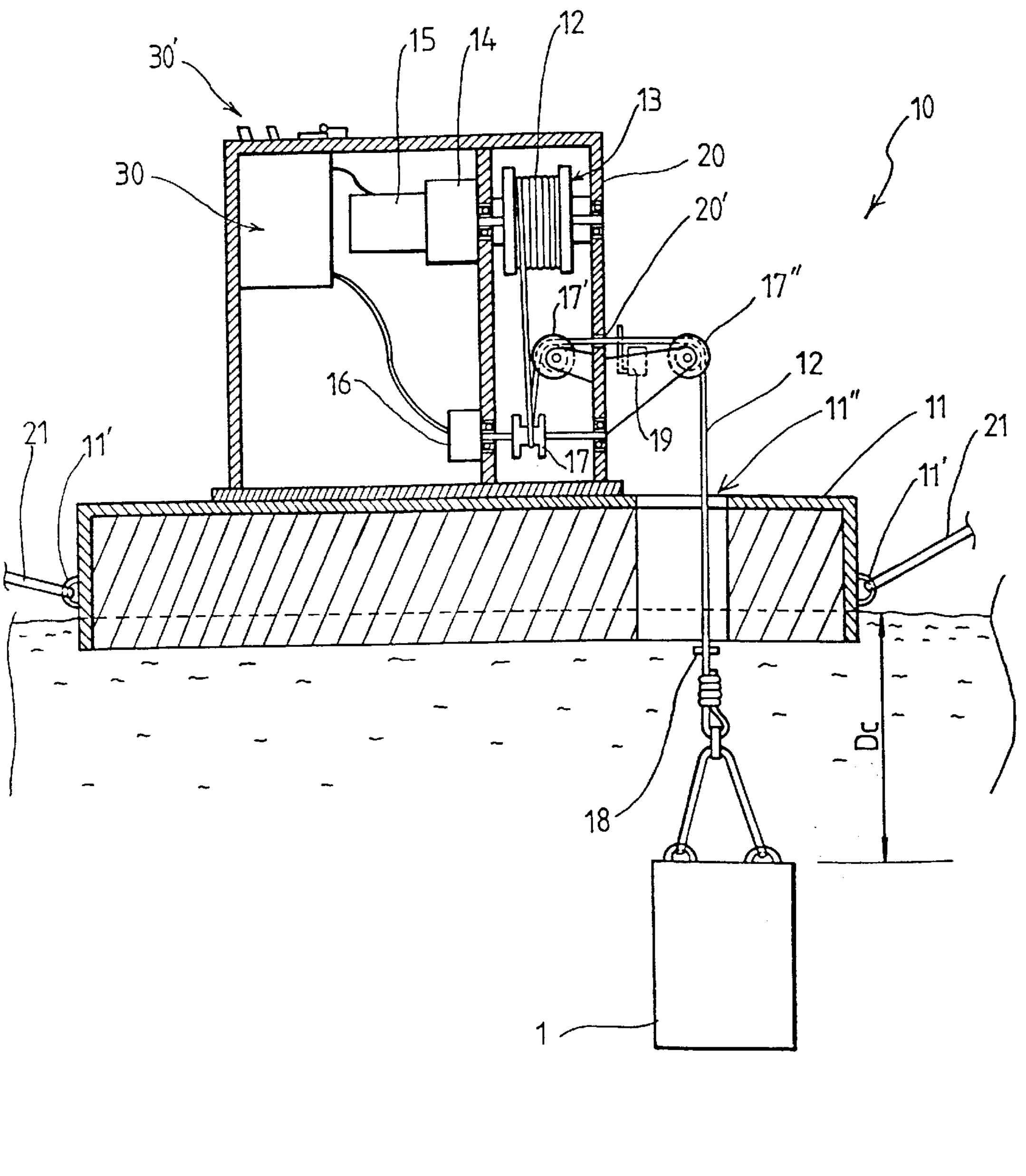
FIG. 1 shows a schematic side view in partial cross-section of the overall construction of an automatic vertical moving system according to one embodiment of the invention.
Figure 2:
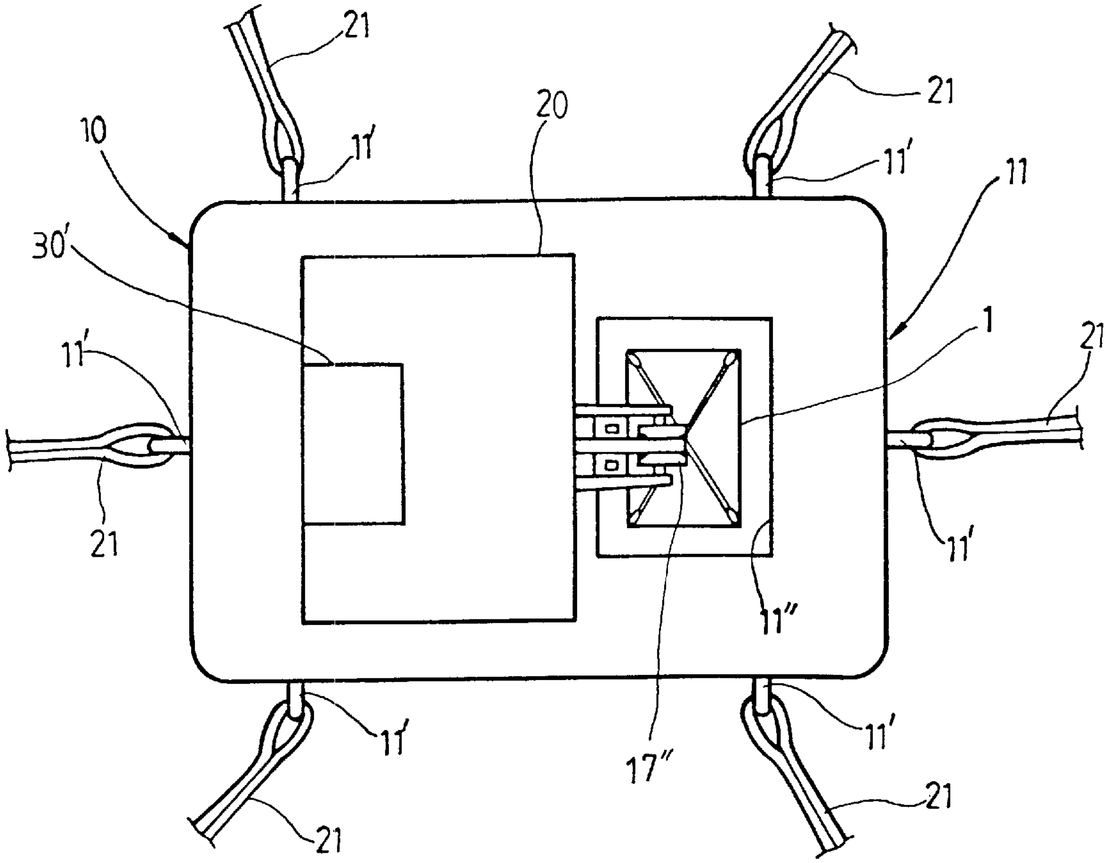
FIG. 2 shows an overlooked plan view of FIG. 1.

Referring particularly to FIGS. 1 and 2, the overall construction of one embodiment of an automatic vertical moving system 10 for vertically lowering and raising an object 1 such as an automatic water quality analysis system with associated internal memory for automatically analyzing water quality is illustrated. In FIGS. 1 and 2, the moving system 10 comprises a floating means or a barge 11, a winch 13, and a forward-and-backward rotation means.

The floating means 11 securely supports the moving system 10 on the surface of the water. In FIG. 2, the floating means 11 is provided with a plurality of hooks 11' therearound. Each of hooks 11' respectively engages with each one end of a fixing cable 21, other end of which is connected to the ground, bridge piers or other firmly fixed floating means. Thus, the floating means 11 is retained at a desired position on the water. When the desired position for retaining the floating means 11 is far from the ground or bridge piers and therefore it is difficult to fix the floating means 11 to the existing structure by means of the fixing cables 21, other firmly fixed floating means can be employed alternatively. A refloating hole 11" may be also provided in a stable position of the floating means 11, through which the object 1 may be lowered down and refloated out of water. The winch 13 is mounted on the floating means 11, which is rotatable in opposite directions to lower or raise the object 1 and provided with a wire rope 12 wound or rewound therearound. The wire rope 12 is connected at its free end to the object 1, which is preferably made from waterproof steel lines such as nickel-chromium plated steel line or plastic coated steel line. The wire rope 12 may be scaled for indicating the lowering depth of the object 1 in the water so as to facilitate manual operation.

In FIG. 1, a housing 20 is mounted on the barge 11 in order to protect the construction of the moving system 10, especially electronic elements or mechanical bearings. The housing 20 is preferably formed into waterproof and hard structure for durability in the open air and support of the moving system 10 including the motor 15, winch 13, guide rollers 17, 17', 17" or the like which will be described in detail hereinafter.

The forward-and-backward rotation means controls rotation of the winch 13 along with its rotational directions between a forward direction to lower down the object 1 and a backward direction to raise up the object 1. The forward-and-backward rotation means may merely comprise a manually controlled handle, or preferably comprise an automatic control means which will be described hereinafter.

Figure 5:
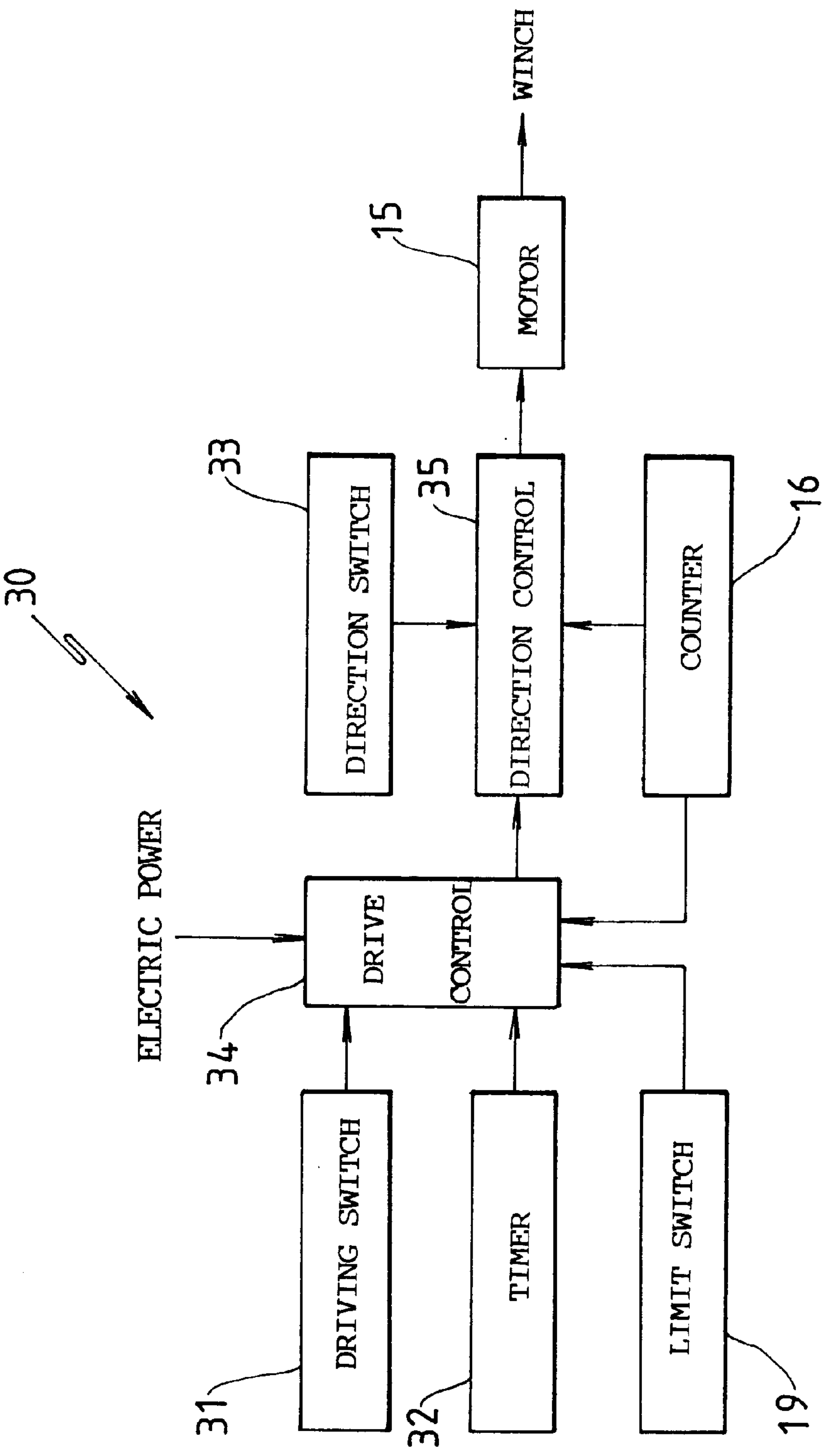
FIG. 5 shows a block diagram illustrating a functional construction of the moving system according to the invention.

As shown in FIGS. 1 and 5 showing a functional construction of one embodiment according to the present invention, the forward-and-backward rotation means may comprise an electric motor 15 connected through a reduction gear means 14 to the winch 13, an electric power supply means, and a motor control means 30. It is to be understood that it is possible to employ any electric motor such as a DC motor, an AC motor, a stepping motor or a servo motor as the electric motor 15 of the present invention, provided that the electric motor may be controlled to rotate in opposite directions and connected to the winch 13 corotated therewith. The motor control means could be constructed in a manner well known to those skilled in the art so as to control the electric motor according to the type thereof for realizing the object of the present invention.

Figure 6:
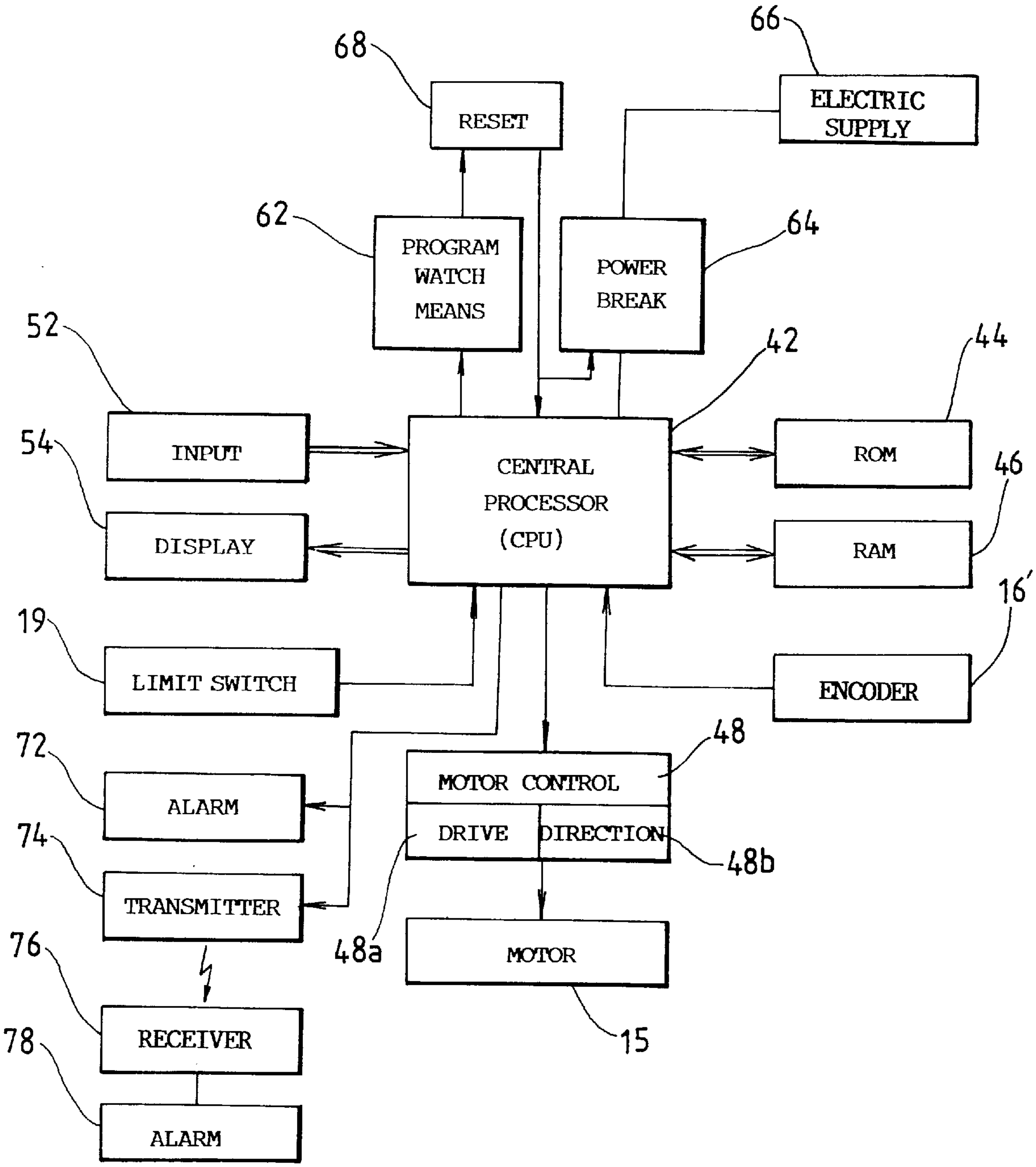
FIG. 6 shows a block diagram illustrating another functional construction of the system according to the invention.
Figure 8:
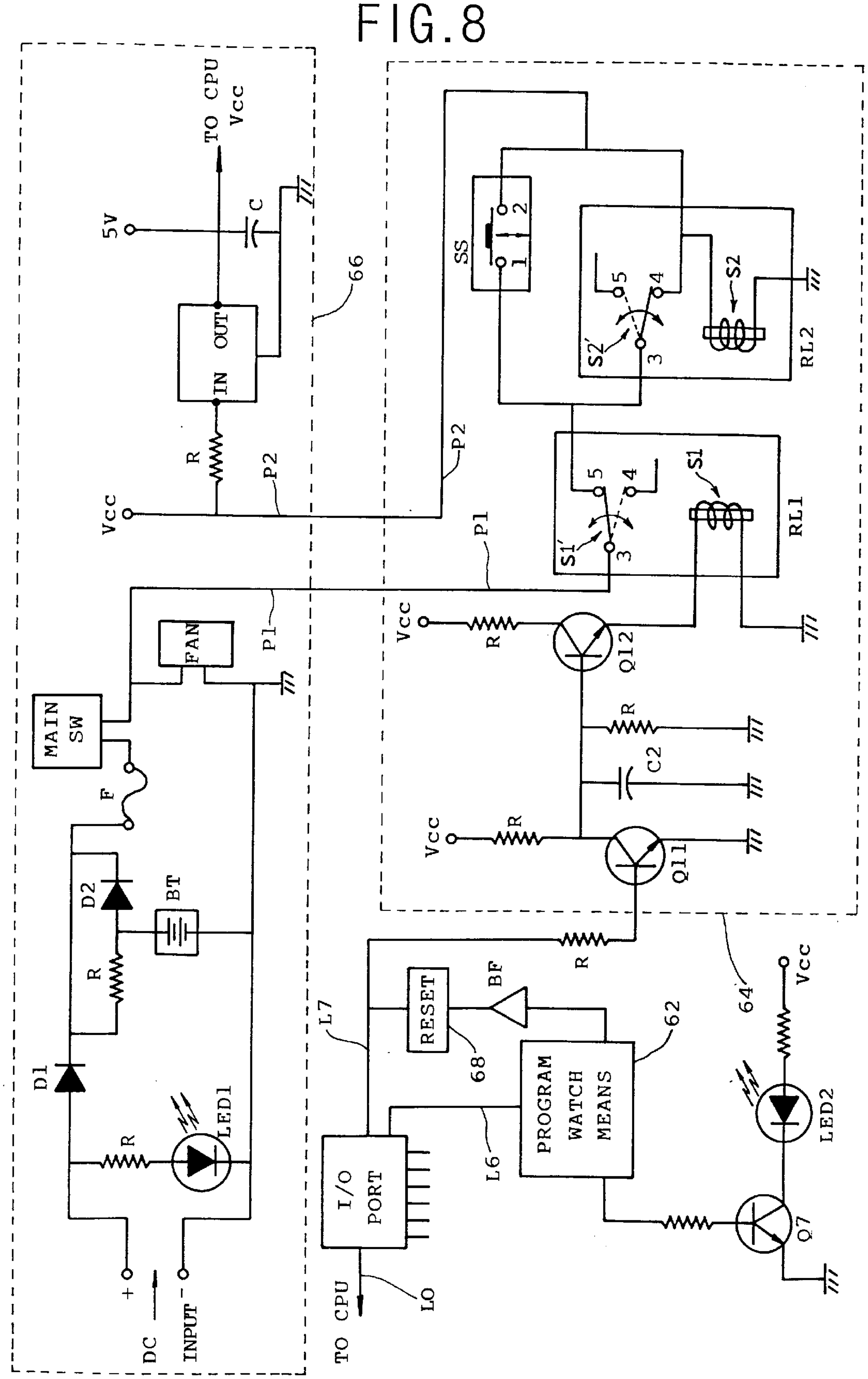
FIG. 8 shows a circuit for shutting off the power supply according to the invention.

The electric power supply means is connected to an electric power source such as AC or DC electric power, and/or a solar battery to supply a proper electric power to the moving system 10 although, in an electric power supply means 66 shown in FIG. 6 and more concretely in FIG. 8, electric power of direct current rectified, for example DC 15 V, is inputted from outside of the moving system 10. Also, the electric power supply means 66 may be constructed in accordance with the type of the electric motor and the construction of the motor control means in a manner well known in the art. Preferably, the electric power supply means 66 comprises a battery BT capable of being charged and discharged for supplying electric power at least lasting a day and more.

In FIG. 8 showing an example of the electric power supply means 66, a Vcc is supplied to the moving system through a supply passageway P1, P2. A main switch is provided for switching on and off the supply of electricity to the overall moving system 10. In order to protect the supply means 66 against an electric overload, a fuse F is installed in the electric power supply means 66 as well known in the art. Also, a lamp LED1 may be provided for indicating normal operation of the electric power supply means 66.

Referring again to FIG. 5, the motor control means 30 controls electrically the motor 15 to be regularly activated or deactivated and to be changed in rotational directions thereof. For such control of the motor 15, as shown in FIG. 5, the motor control means 30 comprises a driving control means 34, a timer 32, a direction control means 35 and a counter 16. A driving switch 31 and a direction switch 33 may be included for manually controlling the motor 15.

The driving control means 34 may be operated by a driving switch 31, the timer 32 and/or a counter 16. The direction control means 35 may be operated by a direction switch 33, the timer 32 and/or the counter 16. The driving switch 31 may switch the driving control means 34 on to effect operation of the motor 15 regardless of the state of the driving control means 34. The direction switch 33 switches the direction control means 35 on/off to effect change of the rotating direction of the motor 15 regardless of the state of the direction control means 35.

The timer 32 is connected electrically to the driving control means 34 for switching the electric power supply means 66 to the motor 15 on to be activated after a predetermined suspending time interval whenever the motor is deactivated. During the predetermined suspending time interval, the winch 13 also stops lowering the object 1, the object 1 is suspended at a certain depth level in the water corresponding to a multiple of a predetermined unit depth, and the object 1 such as an automatic water quality analysis system may analyze the water quality at the certain depth level.

After the predetermined time interval of stop, the timer 32 switches the motor 15 on to be activated. Consequently the winch 13 rotates in the forward direction to release or rewind the wire rope 12 to lower down the object 1. Therefore, the water quality analysis system or the object 1 is moved to another subsequent depth level of the water for further analyzing the water quality.

Figure 3:
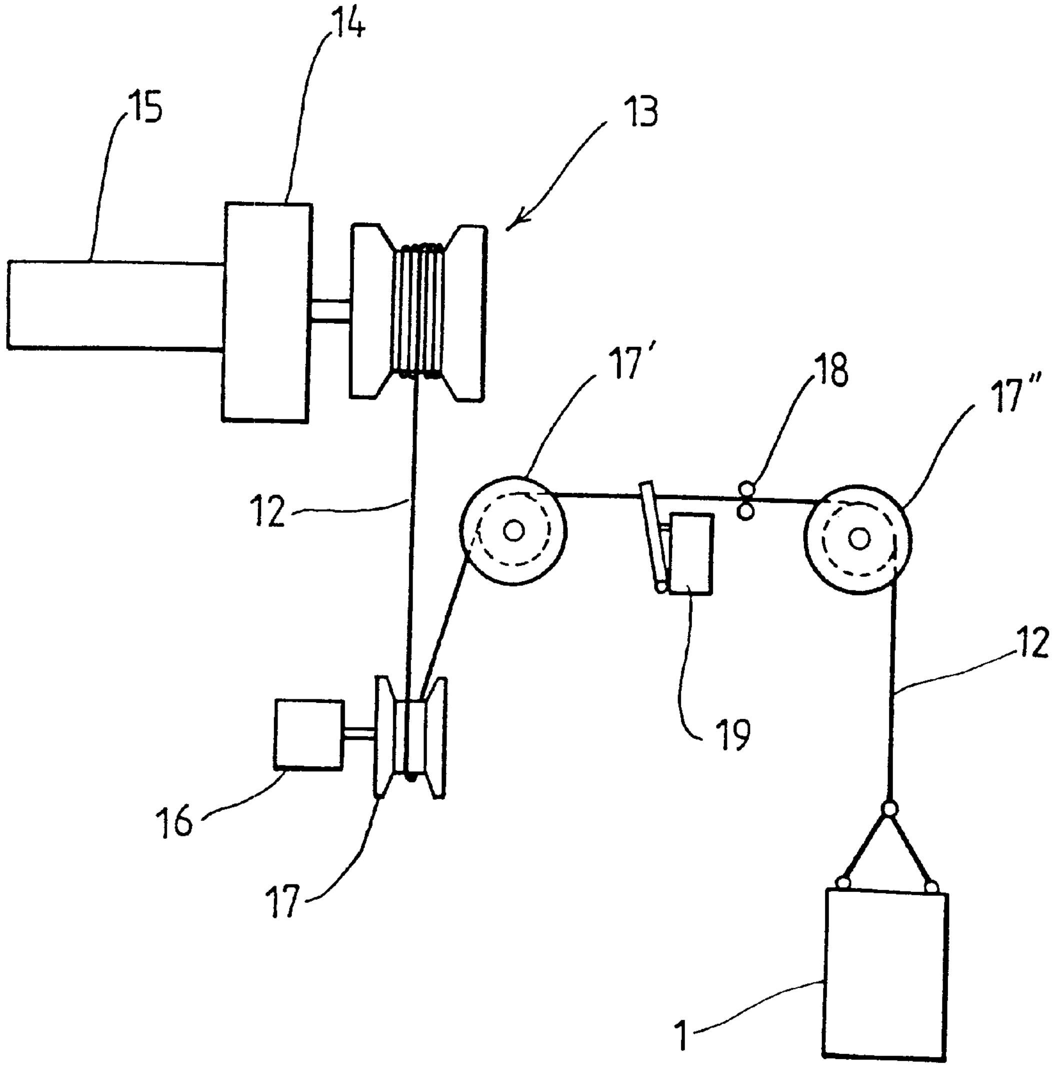
FIG. 3 shows a schematic view illustrating the partial construction of the automatic vertical moving system of FIG. 1.

A plurality of guide rollers 17, 17', 17", as shown concretely in FIGS. 1 and 3, are mounted on the floating means or the barge 11 for guiding the wire rope 12 to be wound or rewound steadily between the winch 13 and the surface of the water. As shown in FIG. 3, according to the present invention, three guide rollers 17, 17', 17" are employed in sequence. A first guide roller 17 and a second guide roller 17' are positioned to apply tension to the wire rope 12 by means of the weight of the object 1 so that the first guide roller 17 may be rotated with the appication of the tension. Consequently, when the wire rope 12 is loosened or slided due to the object's stop with the winch 13 still rotating, the first guide roller 17 can not be rotated. A third guide roller 17" is arranged at the same level as the second guide roller 17' and a limit switch is arranged therebetween as described hereinafter.

The counter 16 coupled to be corotated with the first guide roller 17 for detecting the rotational displacement of the first guide roller 17 and detecting the lowering depth of the object 1. The counter 16 may simply consist of a mechanical counter structure for indicating the depth of the object 1 and it is preferred that the counter 16 is electrically connected through a plurality of electric contacts to the driving control means 34. With the electric contacts, the counter 16 controls the driving control means 34 to switch the motor 15 off for deactivating it whenever the rotational displacement detected by the counter 16 correspond to a multiple of the predetermined rotational displacement during the lowering of the object 1, thereby enabling the object to be lowered at the predetermined unit depth intervals corresponding to the predetermined rotational displacement. Moreover, the counter 16 may include an electric contact which is connected to the driving control means 34 for deactivating the motor 15 whenever the counter 15 is reset with the object 1 raised up to a predetermined level near the surface of the water (that is, surface position).

Therefore, the object 1 starts to be lowered by means of the timer 32 at the predetermined suspending time intervals and stops by means of the counter 16 at the predetermined rotational displacement intervals.

The direction control means 35 is connected to the counter 16 for converting the rotational direction of the motor 15 when the rotational displacement detected by the counter 16 is not changed although the driving control means is driving the motor 15 to lower the object 1. When the object 1 reaches the maximum depth or is suspended in the midway by uncertain matters drifted in the water, tension applied to the first guide roller 17 is removed and the wire rope 12 is loosened or slided at the first guide roller 17. Therefore, the first guide roller 17 can not be rotated along with the counter 16 and the rotational displacement detected by the counter 16 is not changed. Then the motor 15 is rotated in the backward direction for raising the object 1 by means of the direction control means 35. Also, When the counter 16 is reset by raising the object 1 up to the surface position, the direction control means 35 may be adapted to convert the rotational direction of the motor 15, thereby be capable of lowering the object 1 after the predetermined time interval of the timer 32.

With the above construction, the embodiment of the present invention is operated as below. At first, the motor 15 starts to rotate in the forward direction by the electric power supply for lowering the object 1. Also, the motor 15 can start to rotate in the forward direction by operating the driving switch 31 and the direction switch 33 on a manual operating panel 30' by user. Then, the winch 13 rewinds the wire rope 12 through the guide rollers 17, 17', 17" to lower the object 1 in the water and the first guide roller 17 rotates by the tension of the wire rope 12 with the counter 16. When a predetermined rotational displacement has been detected by the counter 16, the driving control means 34 operates to deactivate the motor 15 by the counter 16 and the rotation of the motor 15 is stoped. At the same time, the timer 32 starts to count a predetermined suspending time interval, thereafter activating the motor 15 through the driving control means 34.

Again, the object 1 starts to be lowered down until the counter 16 stops the motor 15 again. Such lowering for the predetermined rotational displacement intervals until the counter 16 deactivates the motor 15 and such stopping for the predetermined suspending time interval until the timer 32 activates the motor 15 may be repeated until the object 1 approaches to a bottom of the water or a maximum depth.

Thus, when the object 1 reaches the bottom of the water, the tension of the wire rope weakens to cause the first guide roller 17 not to rotate. Consequently the counter 16 stops rotating although the motor 15 is still in the activated state in the forward direction. Then, the direction control means 35 converts the rotating direction of the motor 15 to the backward direction so that the object 1 is raised up toward the surface position. Thus, when the object 1 reaches the surface position, the counter 16 is reset, thereby deactivating the motor 15 to stop rotating and converting the rotating direction of the motor 15. At the same time, the timer starts to count the predetermined suspending time interval, and thereafter the motor 15 is activated to rotate in the forward direction and lower the object 1 from the surface position again. Thus, such lowering and raising is repeated continuously and regularly by means of the timer 32 and the counter 16.

As shown in FIGS. 3 and 5 as a preferable embodiment according to the present invention, the automatic vertical moving system 10 may further comprise a detecting means for electrically detecting whether the object 1 is raised up to the surface position. In this case, the function to be effected when the counter 16 is reset in the foregoing embodiment is achieved by the detecting means. The detecting means comprises a limit switch 19 and an operating means 18. The limit switch 19 is mounted on the floating means or barge 11 between the second guide roller 17' and the third guide roller 17", and electrically connected to the driving control means 34 for deactivating the motor 15 when the limit switch 19 is switched on by the operating means 18. Also the limit switch 19 is electrically connected to the direction control means 35 for converting the rotational direction of the motor 15 when the limit switch 19 is switched on by the operating means 18. Preferably, as shown in FIG. 3, the limit switch 19 is installed between the second guide roller 17' and the third guide roller 17" in order to ensure the proper operation thereof. And, the operating means 18 is fixed on the wire rope 12 at a position near its free end to effect switching-on of the limit switch 19 when the object 1 is raised up to the surface position, and to effect switching-off of the limit switch 19 when the object 1 is lowered just below the surface position. The operating means 18 may be a knot formed in the wire rope 12 by knotting itself once or more, or a ring fixed around the wire rope 12.

In addition, as shown in FIG. 1, according to one of preferable embodiments of the present invention, when the third guide roller 17" is mounted outside of a side wall of the housing 20, a hole 20' may be formed through the side wall of the housing 20 so that the wire rope 12 may pass therethrough and the operation means 18 such as a knot or a ring may not be passed through the hole 20' for safety. And the driving control means 34 may include a protect circuit means (not shown in the drawings) to protect the motor 15 from any electric overload. In this case, when the limit switch 19 is not working and the motor 15 rotates to raise the object 1 over the surface of the water, the operating means 18 such as a knot or a ring is hold back by the hole 20' and thereby the motor 15 is overloaded. Then the protect circuit means operates, for example, to shut off the power supply so as to protect the motor 15.

In operation with the construction including the detecting means, the wire rope 12 is rewound from the winch 13 via the guide rollers 17, 17', 17" and through the hole 20' when the motor 15 starts to rotate in the forward direction as described above, thereby lowering the object 1 in the water. Then the first guide roller 17 rotates by the tension of the wire rope 12 with the counter 16.

Lowering of the object 1 for the predetermined rotational displacement intervals until the counter 16 deactivates the motor 15 and stopping for the predetermined suspending time interval until the timer 32 activates the motor 15 are repeated in a manner similar to the foregoing operation until the object 1 approaches to a bottom of the water or a maximum depth. Also, when the object 1 reaches the bottom of the water, the object 1 is raised up toward the surface position similarly to the foregoing operation. However, when the object 1 reaches the surface position, the limit switch 19 is switched on by the operating means 18, thereby deactivating the motor 15 to stop rotating. With the limit switch 19 switched on, the direction control means 35 converts the rotating direction of the motor 15. And the timer 32 counts again the predetermined time interval and thereafter activates again the motor 15 to rotate in the forward direction. Thus, such lowering and raising is repeated continuously and regularly by means of the timer 32, the counter 16 and the limit switch 19.

For example, where the timer 32 is set to 10 minutes and the counter 16 has electric contacts every position corresponding to 1 meter (m) in order to lower the object 1 about 1 m in about 10 minutes, it is possible to analyze the water quality around 5 times over about 50 m depth of the water.

Thus, the object 1 such as an automatic water quality analysis system may be regularly lowered every predetermined unit depth with the predetermined suspending time intervals to approach at the bottom of the water, and thereat raised up to the surface position, which may be repeated for desired times. And then the water quality analysis system may be refloated out of water through the refloating hole 11" onto the floating means 11 by user and it is possible to retrieve the data collected and stored in the water quality analysis system.

Another embodiment of the automatic vertical moving system 10 according to the present invention will now be described by making reference to FIGS. 6 to 8. It is to be understood that the mechanical construction of this embodiment is mostly same as shown in FIGS. 1 to 3.

As shown in FIGS. 1 and 6, the moving system 10 comprises a floating means 11, a winch 13, and a forward-and-backward rotation means. The forward-and-backward rotation means comprises an electric DC motor 15, an electric power supply means 66 and a motor control means 48. The floating means 11, the winch 13, the electric motor 15 and the electric power supply means 66 are same as described above.

The motor control means 48, as in FIG. 6, comprises a driving control means 48*a*, a direction control means 48*b* and a control system. The driving control means 48*a* switches the electric power supply means 66 to the motor 15 on and off. The direction control means 48*b* converts the rotational direction of the motor 15. The control system is connected to the driving control means 48*a* and the direction control means 48*b* for controlling the driving control means 48*a* to switch the electric power supply means 66 to the motor on for a predetermined depth time interval T1 and off for a predetermined suspending time interval T2. So, the object 1 can be lowered for one depth time interval T1 corresponding to the predetermined unit depth and suspended for one suspending time interval T2. Such lowering and suspending are repeated for a predetermined entire lowering time Td. The predetermined entire lowering time Td is determined from one depth time interval T1, one suspending time interval T2 and the times of lowering and suspending.

Then, the control system controls the direction control means 48*b* to convert the rotational direction of the motor 15, so that the object 1 can be raised for a predetermined pure raising time interval Tr up to the surface position, the predetermined pure raising time interval Tr being capable of being determined from the one depth time interval T1 and the number of times of lowering. And then the control system controls the direction control means 48*b* to convert the rotational direction of the motor 15, so that the object 1 can be again lowered down from the surface position. Thus, such lowering and raising of the object 1 within the predetermined maximum depth Dm is automatically repeated by means of the motor control means 48.

Figure 7:
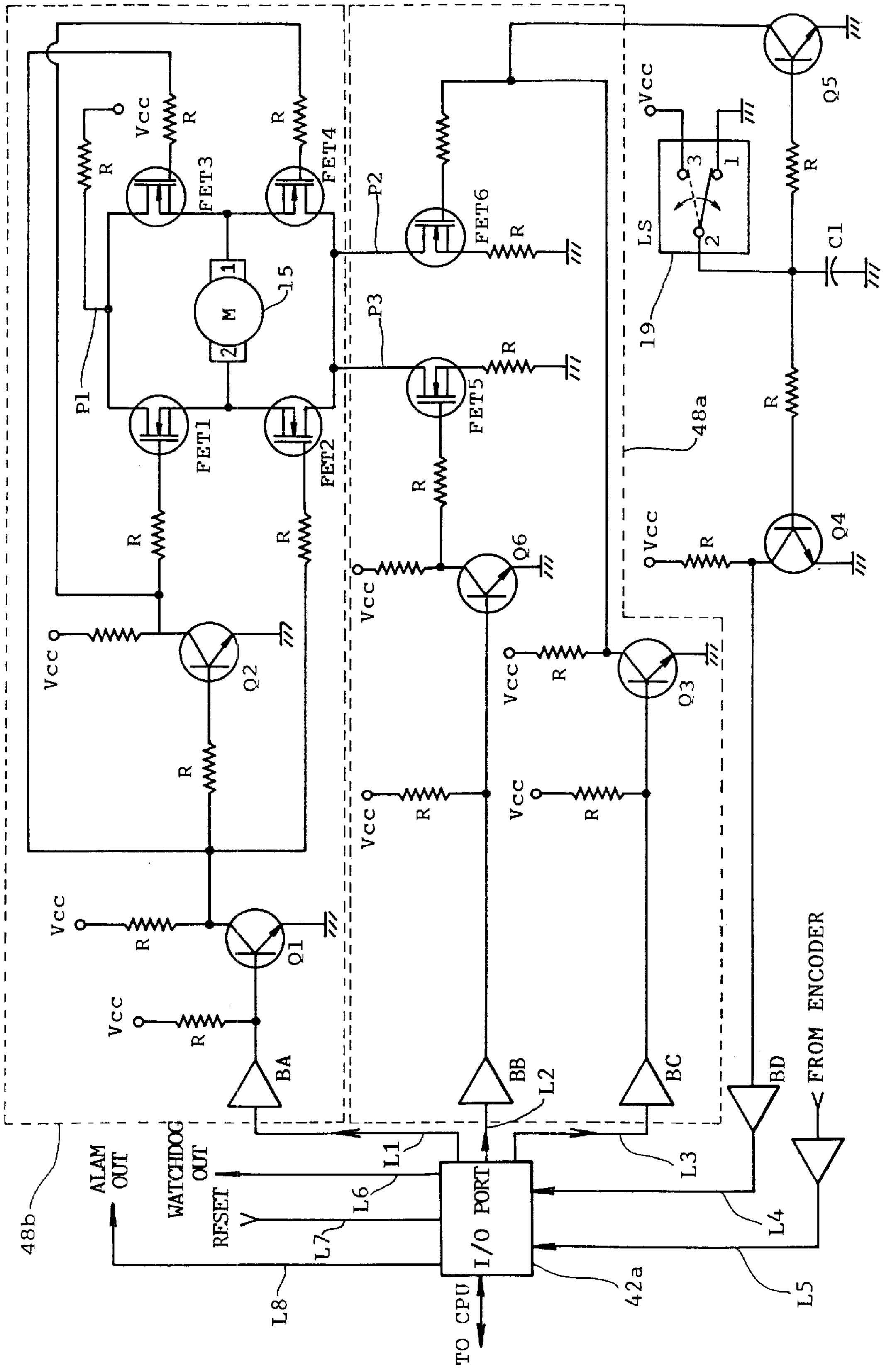
FIG. 7 shows a circuit for controlling the motor according to the invention.

More concretely, referring to FIG. 7, the driving control means 48*a* includes a first driving switching means FET6 of a field effect transistor for switching the electric power supply means 66 to the motor 15. With the first driving switching means FET6 switched on, the motor 15 is activated. And with the first driving switching means FET6 switched off, the motor 15 is deactivated.

The direction control means 48*b* includes a first and a second forward switching means FET2 and FET3 and a first and a second backward switching means FET1 and FET4 for switching the connection of the electric power supply means to the motor selectively between a first terminal 1 and a second terminal 2 of the motor 15 so that the motor may be rotatable in the forward direction when the first and the second forward switching means are switched on and the motor may be rotatable in the backward direction when the first and the second backward switching means are switched on. Also, the direction control means 48*b* further includes a first direction switching means Q1 and a second direction switching means Q2 for switching the first and second forward switching means FET2 and FET3 and the first and second backward switching means FET1 and FET4 on/off respectively and connected to each other in a manner interlocked to be switched on alternatively. Therefore, the first and the second forward switching means FET2 and FET3 and the first and the second backward switching means FET1 and FET4 are interlocked to be switched on alternatively.

These driving and direction control means 48 are controlled by a control system which comprises a microprocessor or a central processor (CPU) 42, and memory means including ROM 44 and RAM 46. The central processor 42 processes interrupted signals from an internal timer (not shown) to acquire data of a reference time Tc, executes a program to establish predetermined controls, and outputs a plurality of control signals to the driving control means 48*a* and the direction control means 48*b*. The control signals outputted from the CPU 42 are provided with a first driving signal for switching on/off the first driving switching means FET6 of the driving control means 48*a* via a transistor Q3, and a direction signal for switching the direction control means 48*b*. The ROM 44 may store the program for establishing predetermined controls and the RAM 46 may store data generated during the execution of the program. In FIG. 6, necessary I/O ports 42*a* and interfaces are omitted.

As shown in FIG. 7, it is preferred that the driving control means 48*a* should be constructed so that the first driving switching means FET6 may be switched on and the motor may be activated when the first driving signal from the CPU 42 through I/O ports 42*a* is LOW. Thus, the motor is deactivated by a HIGH signal generated from the CPU 42 at the outset when the electric power is applied to the moving system; otherwise the motor 15 might be activated although the driving signal was not outputted by the program.

That is, in FIG. 7, when the first driving signal of LOW from the CPU 42 applies to a transistor Q3 via the I/O ports 42*a*, a line L3 and a buffer BC, the transistor Q3 is turned off and the first driving switching means FET6 is turned on in the off state of a transistor Q5 by a Vcc applied to a collector of the transistor Q3, so that the motor 15 is activated using a line P2. On the contrary, when the first driving signal of HIGH from the CPU 42 applies to the transistor Q3 via the I/O ports 42*a*, the line L3 and the buffer BC, the transistor Q3 is turned on and the first driving switching means FET6 is turned off, so that the motor 15 is deactivated in the off state of a first driving switching means FET5 via a line P3, which is described hereinafter.

Also, it is preferred that the direction control means 48*b* should be designed so that the motor may rotate in the backward direction when the direction signal from the CPU 42 through I/O ports 42*a* is HIGH. Therefore, at the outset when the electric power is applied to the moving system, the motor 15 rotates in the backward direction by a HIGH signal generated from the CPU 42 and so the object 1 is raised up to the surface position shortly; otherwise, it would take much time to lower down and raise up the object 1 for preparation.

That is, in FIG. 7, the central processor or CPU 42 outputs the direction signal of HIGH or LOW via I/O ports 42*a* and a line L1. When the HIGH direction signal from the CPU 42 is applied to the base of the first direction switching means or transistor Q1 via the line L1 and a buffer BA, the first direction switching means Q1 is turned on and the second direction switching means Q2 turned off with the first and second backward switching means FET1 AND FET4 turned on and the first and second forward switching means FET2 and FET3 turned off; hence a Vcc applies to the motor 15 through line P1 so that the motor 15 may be rotatable in the backward direction. On the contrary, when the LOW direction signal from the CPU 42 is applied to the base of the first direction switching means or transistor Q1 via the line L1 and a buffer BA, the first direction switching means Q1 is turned off and the second direction switching means Q2 turned on with the first and second backward switching means FET1 and FET4 turned off and the first and second forward switching means FET2 and FET3 turned on; hence a Vcc applies to the motor 15 through line P1 so that the motor 15 may be rotatable in the forward direction.

Consequently, when both the first driving signal and the direction signal are LOW, the motor 15 rotates in the forward direction, thereby lowering the object 1. And, when the first driving signal is LOW and the direction signal is HIGH, the motor 15 rotates in the backward direction, thereby raising the object 1. When the first driving signal is HIGH, the motor 15 is deactivated to stop rotating, thereby maintaining or suspending the object 1.

According to another embodiment of the present invention, a plurality of guide rollers 17, 17', 17" and a rotary encoder 16' may be also provided, as shown in FIG. 6. The plurality of guide rollers 17, 17', 17" are mounted on the floating means 11 as described hereinbefore relating to FIG. 3. The rotary encoder 16' is coupled with the rotating guide roller 17 for outputting through a line L5 and the I/O ports 42*a* into the CPU 42 electric signals corresponding to the rotational displacement of the guide roller 17 so that the CPU 42 can calculate at least a present depth Dc of the object 1 in the water and control the lowering of the object 1 by means of the present depth Dc and a predetermined unit depth Di instead of the reference time Tc and the predetermined depth time interval Ti. Also, the CPU 42 can control the rotational direction of the motor 15 through the direction control means 48*b* using the electric signals from the encoder 16'. That is, in FIG. 7, the rotational direction of the motor 15 is converted by the HIGH direction signal generated from the CPU 42 when the present depth Dc is equal to a predetermined maximum depth Dm or when, the object 1 reaching the bottom of the water or being suspended in the midway by uncertain matters drifted in the water, the CPU 42 does not detect any electric signal from the encoder 16' during the lowering of the object 1 for a predetermined time; hence the object 1 can be raised up. Also, the rotational direction of the motor 15 is converted by the LOW direction signal generated from the CPU 42 when the present depth Dc is a zero during the raising the object 1, instead of converting the rotational direction of the motor 15 at the predetermined pure raising time Tr in the foregoing embodiment; hence the object 1 can be lowered down.

Consequently, the object 1 can be lowered by every predetermined unit depth Di and suspended for one suspending time interval T2 whenever the motor 15 is deactivated. Such lowering and suspending can be repeated until the object 1 reaches the predetermined maximum depth Dm or the bottom of the water, and then the object 1 can be raised up to the surface position. Thus, such lowering and raising of the object 1 can be automatically repeated using the encoder 16'.

In a still another embodiment according to the present invention, a detecting means may be further provided in addition to the above construction for detecting the object 1 at the surface position of the water. The detecting means comprises a limit switch 19 and an operating means 18, which constructions are similar to those described above with regard to FIG. 3.

In this particular embodiment, the limit switch 19 is connected to the first driving switching means FET6 via a transistor Q5, as shown in FIG. 7, for deactivating the motor 15 when operated. when operated, the limit switch 19 applies a Vcc to the transistor Q5 via electric contacts 1 and 3 thereof and the transistor Q5 is turned on, so that the first driving switching means FET6 is turned off although the first driving signal of LOW from the CPU 42 applies to a transistor Q3 for turning on the first driving switching means FET6. Therefore, when the limit switch 19 is operated by the operating means 18 at the surface position as described in the foregoing embodiment, the motor 15 is deactivated and the object 1 is suspended at the surface position. Meanwhile, except when the object 1 is at the surface position, the limit switch 19 connects contacts 1 and 2 thereof and the Vcc is not applied to the transistor Q5, so that the transistor Q5 is turned off; hence the motor 15 is activated by the first driving signal of LOW from the CPU 42.

Also, the limit switch 19 is connected to the CPU 42 via a transistor Q4, a buffer BD and a line L4 of the I/O ports 42*a* as shown in FIG. 7. Therefore, a status signal of the limit switch 19 is inputted to the CPU 42 and the CPU 42 can detect whether the limit switch 19 is operated.

Still, the control system further comprises a second driving switching means FET5 via a line L2 of I/O ports 42*a*, a buffer BB and a transistor Q6, which is connected to the motor 15 to activate the motor 15 via a supply passageway P3 independent of the first driving switching means FET6 and turned on by means of a second driving signal of LOW from the CPU 42; hence the CPU 42 can activate the motor 15 for lowering the object 1 from the surface position according to the on-status signal of the limit switch 19 when the first driving switching means FET6 cannot be controlled by the CPU 42 due to the operation of the limit switch 19 at the surface position. Once the limit switch 19 is switched off due to the lowering of the object 1 and the off-status signal of the limit switch 19 is inputted to the CPU 42, then the CPU 42 may control the motor 15 by means of the first switching means FET6 and the first driving signal.

In this case, the lowering the object 1 every predetermined unit depth Di at the predetermined suspending time intervals T2's and the raising of the object 1 up to the surface position are repeated by the CPU 42 using the encoder 16' and the limit switch 19.

As shown in FIG. 6, the control system further comprising a reset means 68 and a program watch means 62. The reset means 68 is connected to the CPU 42 to generate a reset signal to the CPU 42 for automatically resetting the control system when the reset means 68 is enabled. The program watch means 62 is connected to the CPU 42 to detect a watchdog signal from the CPU 42 every execution of the program for supervising whether the program is executed normally. Also, the program watch means 62 is connected to the reset means 68 for enabling it to reset the control system when the watchdog signal is not detected.

In FIG. 8, the program watch means is connected to a line L6 of the I/O ports 42*a*. When the CPU 42 executes the program normally, the CPU 42 outputs the watchdog signal through line L6 to the program watch means 62 at one or more desired positions of the program. The program watch means 62 determines the status of the CPU 42 as normal when the watchdog signal is detected. If the watchdog signal is not detected, then the program watch means 62 determines the status of the CPU 42 as abnormal and enables the reset means 68. At such abnormal status, the reset means 68 is enabled by means of the program watch means 62 via a buffer BF, thereby applying a reset signal to the CPU 42 via a line L7 of the I/O ports 42*a*. Consequently, the control system is reset. Also, a light emitting diode LED2 as shown in FIG. 8 can be provided for indicating the abnormal status by being operated by means of the program watch means 62 via a transistor Q7.

Furthermore, as shown in FIG. 8 a guarding device such as a power break means 64 may be provided between supply passageways P1, P2 for protecting the control system from frequent reset operations. The guarding device or power break means 64 is connected to the reset means 68 for receiving the reset signal from the reset means 68 and comprises a first guarding switching means Q11, a capacitor C2, a resistor R, a second guarding switching means Q12, a first electromagnetic relay RL1, a second electromagnetic relay RL2, and a start switch SS. The first guarding switching means Q11 is connected to be operable by a reset signal generated from the reset means 68 so as to output an amount of electric voltage Vcc. This electric voltage temporarily charges the capacitor C2 and the temporarily charged voltage of the capacitor C2 is discharged via the resistor R. However, when the temporarily charged voltage is above a predetermined voltage level by means of reset signals inputted with more than a predetermined frequency depending on the time constant of the capacitor C2 and resistor R, the second guarding switching means Q12 is operated and a first solenoid coil S1 of the first electromagnetic relay RL1 is deenergized by means of Vcc, thus the electric power supply through the passageway P1, P2 is disconnected.

In normal status, the supply passageway P1, P2 is connected through the deenergized first electromagnetic relay RL1 by switching a first changeover switching means S1' on (i.e., its contact 3 is connected to its contact 5 and disconnected from its contact 4) and the energized second electromagnetic relay RL2 by switching a second changeover switching means S2' on (i.e., its contact 3 is connected to its contact 4 and disconnected from its contact 5). Once the second guarding switching means Q12 is switched on, Vcc is applied to the first solenoid coil S1 of the first electromagnetic relay RL1. Then the first changeover switching means S1' of the first electromagnetic relay RL1 is switched off (i.e., its contact 3 is disconnected from its contact 5 and connected to its contact 4) so as to disconnect the supply passageway P1, P2. Also, the second solenoid S2 of the second electromagnetic relay RL2 is deenergized and the second changeover switching means S2' of the second electromagnetic relay RL2 is switched off (i.e., its contact 3 is disconnected from its contact 4 and connected to its contact 5). Thus, the power supply is shut off from the overall moving system 10 and the overall system is protected from errors generated continuously or consecutively with more than the predetermined frequency. With the shut-off of the electric power, the first solenoid coil S1 is deenergized and the first changeover switching means S1' is switched on (i.e., its contact 3 is connected to its contact 5 and disconnected from its contact 4 again).

The start switch SS permits the supply passageway P1, P2 to supply electricity to the control system so as to recover it from the shut-off state. When the start switch SS is pushed, the supply passageway P1, P2 is connected to supply the electric power to the control system for the pushing time and the second solenoid S2 of the first electromagnetic relay RL1 is energized so as to switch the second changeover switching means on. Then, although the pushing force on the start switch SS is removed, the second electromagnetic relay RL2 is in the energized state since the second electromagnetic relay RL2 is energized by switching the second changeover switching means S2' on and the second changeover switching means S2' is in the switching-on state by means of the energized second electromagnetic relay RL2. Accordingly, the supply passageway P1, P2 is maintained to be connected by means of the deenergized first relay RL1 and the energized second relay RL2 until the second guarding switching means is switched on by means of the frequent reset operations.

Moreover, as shown in FIG. 6, an input means 52 and a display means 54 such as a notebook computer may be connected to the control system of the moving system 10 for manually and externally accessing the control system and the motor 15. The input means 52 permits a user to input manually predetermined external control signals and/or data to the control system. The display means 54 permits the user to know about the status of the object 1 and/or predetermined data. In this case, the program executed by the CPU 42 may further comprises steps of supervising the external control signals from the input means 52, transmitting data stored in the memory means, and controlling the driving control means 48*a* and the direction control means 48*b* in response to the external control signals. Thus, the user may set the values of environment variables in the program, and control the motor 15 for lowering and raising the object 1 by means of the input means 52.

Figure 4:
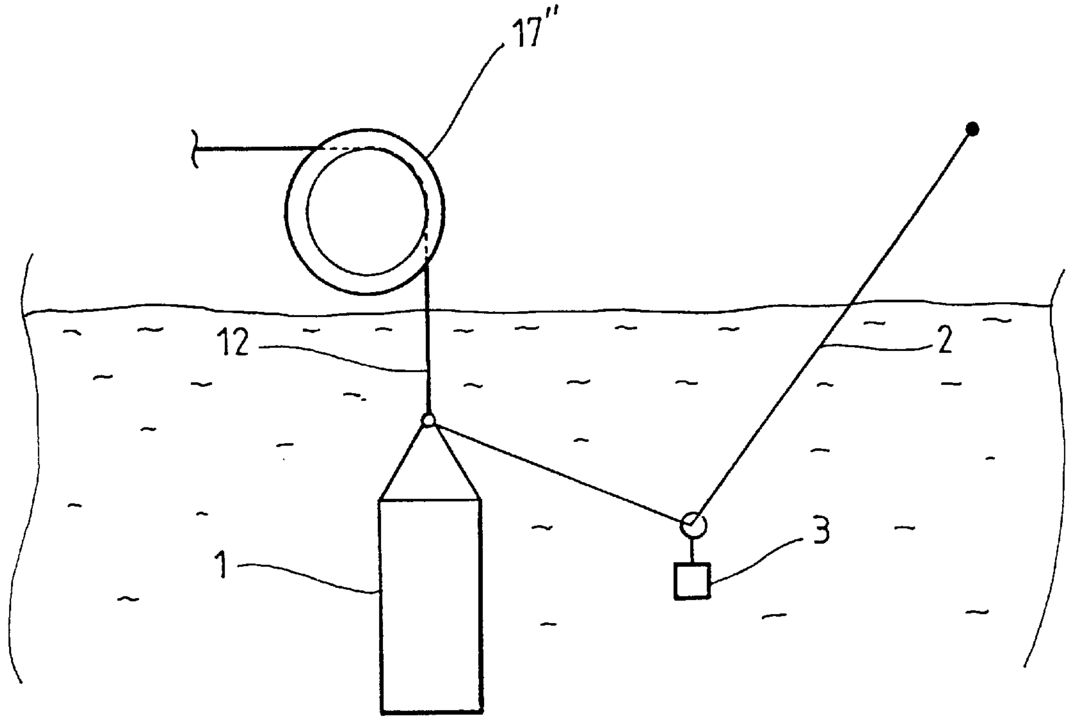
FIG. 4 shows a protect means from missing of the object according to another embodiment of the invention.

As shown in FIG. 4, the moving system 10 may further comprise at least one assistant line or rope 2 and one weight 3. The assistant rope 2 is provided between the object 1 and a fixed body such as bridge piers, the ground or other firmly fixed floating means in order to prevent the object 1 from missing away in case that the object 1 is isolated from the wire rope 12. The weight 3 is connected to the assistant rope 2 along which it can move freely by its gravity force so that it can provide tensional force to the wire rope 12 and assistant rope 2. In addition, as in FIG. 6, alarm means 72, 78 may be provided with the control system for indicating some abnormal situation such as missing of the object 1 in water. And a transmitter 74 may be installed for transferring an alarm signal from the CPU 42 to an outside receiver 76. The transferring may be performed by use of an wireless signal. Moreover, communication cables between the object 1 such as an automatic water quality analysis system and an external control system such as a notebook computer for acquiring real time data of water quality also can be used as the assistant rope 2.

One method, in which the motor 15 is controlled by using the motor control means 48 and the control system provided with a CPU 42 executing a program and associated memory means 44, 46 storing the program and data generated during the program execution without the encoder 16' and the detecting means in FIG. 6, comprises a suspending step, a lowering step, a first repeating step and a returning step.

First, in the suspending step, the motor 15 is deactivated to stop rotating for a predetermined suspending time Ts for maintaining or suspending the object 1 at its vertical level in the water. Subsequently, in the lowering step, the motor 15 is activated to rotate in the forward direction for lowering the object 1 in a predetermined depth time Td corresponding to a predetermined depth Di. As a result, the object 1 is be lowered from the prior position to the next position by around the predetermined depth Di. And then, in the first repeating step, the suspending step and the lowering step are repeated alternatively for a predetermined entire lowering time Td, which is determined from the number of suspending and lowering, the predetermined suspending time Ts and the predetermined depth time Td or for which the object 1 reaches a predetermined maximum depth Dm. Finally, in a returning step, at the predetermined maximum depth Dm, the motor 15 is activated to rotate in the backward direction for raising up the object 1 to the surface position. Thus, this control method permits the moving system 10 automatically to lower and suspend the object 1 in the depth time Td and the suspending time Ts until the predetermined maximum depth Dm and then raising the object 1 up to the surface position for a predetermined pure raising time Tr which is determined substantially from the number of suspending and lowering and the predetermined depth time Td. Then the object 1 may be refloated out of water by a user who extracts data stored in the object 1. Alternatively, the object 1 may again be lowered in the water.

Another method, in which the motor 15 is controlled by using the encoder 16', the detecting means, the motor control means 48 and the control system provided with a CPU 42 executing a program and associated memory means 44, 46 storing the program and data generated during the program execution, comprises a suspending step, a lowering step, a first repeating step, a returning step and an interrupting step, which are included in FIGS. 9 to 12 as a flow chart.

First, in the suspending step, the motor 15 is deactivated for a predetermined suspending time Ts to suspend or maintain the object 1 at its vertical level in the water (S09). Then, the object 1 may analyze water quality at the level. Thus, if the predetermined suspending time Ts has passed (S09), the CPU 42 outputs a first driving signal of LOW (S10) for turning on the first driving switching means FET6 and the motor 15 is activated in the forward direction, thereby lowering the object 1.

There are two ways for determining whether the predetermined suspending time Ts has elapsed during suspending. A first way is that of comparing MOD (Tc/Ti) with a zero (S09), wherein a predetermined unit time interval Ti is the total time interval elapsed in lowering the object 1 by one predetermined unit depth interval Di and then suspending the object 1 at its level, the sum of the predetermined suspending time Ts and the time corresponding to the predetermined unit depth interval Di given as the predetermined unit time interval Ti. A second way is that of comparing MOD (Tc/Ti) with a zero (S09), wherein the predetermined unit time interval Ti is equal to the predetermined suspending time Ts, the reference time Tc reset at the beginning of the suspending step (S12).

Generally, since the time in lowering the object 1 as the water quality analysis system by the predetermined unit depth interval Di, for example 5 seconds is much shorter than the predetermined suspending time Ts for analyzing the water quality, for example 10 minutes so that the reference time Tc is not required to be reset in the first way, the first way is preferred to the second way.

Subsequently, in the lowering step, the motor 15 is activated to rotate in the forward direction for lowering the object 1 by a predetermined unit depth interval Di until a present depth Dc obtained from the rotary encoder 16' equals to a multiple of the predetermined unit depth interval Di. In order to determine whether the object is lowered by the predetermined unit depth interval Di after starting lowering, MOD (Dc/Di) is compared with a zero (S11). When MOD (Dc/Di) is a zero which means that Dc equals to a multiple of Di, the motor 15 is deactivated by turning off the first driving switching means FET6 of the driving control means 48*a* by means of the first driving signal of HIGH outputted from the CPU 42 (S12). At the same time, where the predetermined suspending time is given as the predetermined unit time interval Ti, the reference time Tc is reset by a zero.

Next, in the first repeating step, if the present depth Dc does not equal to the predetermined maximum depth Dm, the suspending step (S09 and S10) and the lowering step (S11 and S12) are repeatedly executed until the present depth Dc equals to a predetermined maximum depth Dm (S13). As a result, the object 1 reaches the predetermined maximum depth Dm in the water.

Finally, when the present depth Dc is the predetermined maximum depth Dm, in the returning step, the motor 15 is activated to rotate in the backward direction for raising up the object 1 to the surface position (S16 or S02) until the detecting means is operated to deactivate the motor 15 (S17 or S03). That is, if the present depth Dc equals with the predetermined maximum depth Dm (S13), the CPU 42 may output direction signal of HIGH and first driving signal of LOW to rotate the motor 15 in backward direction to raise to object 1 (S16 or S02). So the object 1 is raised up to the surface position where the detecting means or the limit switch 19 is operated for deactivating the motor 15 (S17 or S03) by turning off the first driving switching means FET6.

Figure 11:
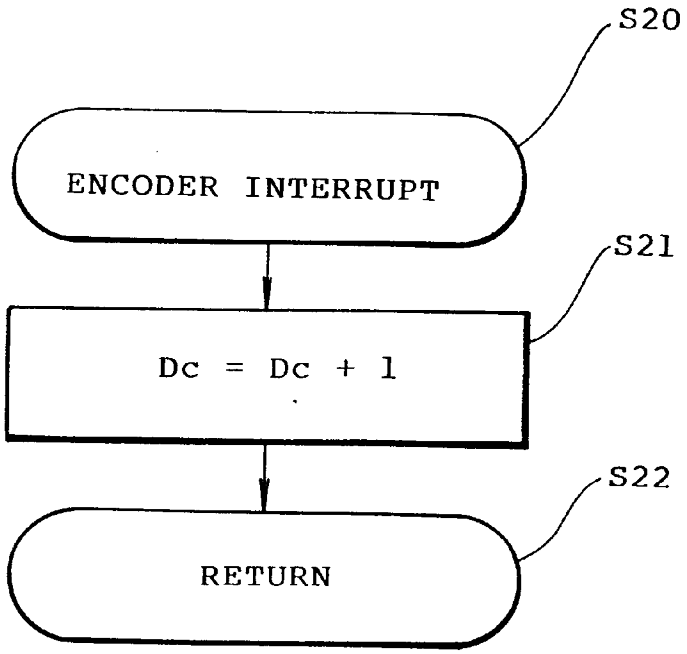
Figure 12:
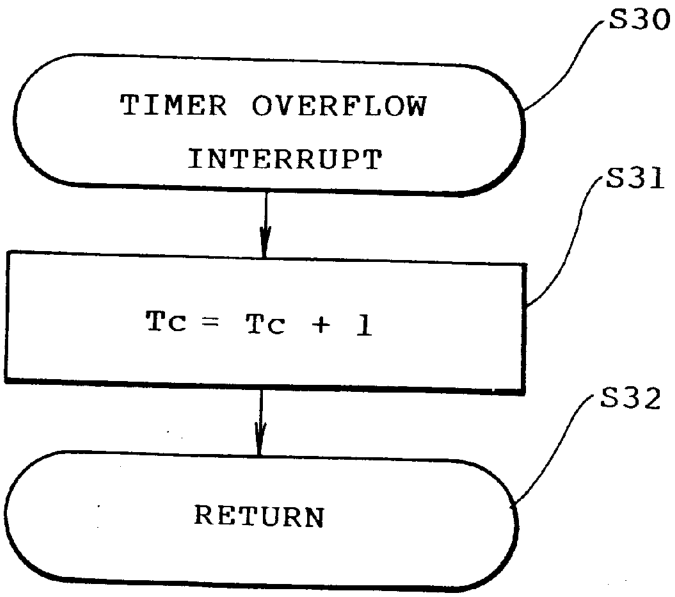

Independent of the suspending step to the returning step, as shown in FIGS. 11 and 12, the interrupting step permits the CPU 42 to acquire interruptedly the reference time Tc and the present depth Dc by receiving pulse signals from an internal timer (S30, S31 and S32) and the rotary encoder 16' (S20, S21 and S22). Thus, this control method allows the moving system 10 automatically and repeatedly to lower and maintain the object 1 in the predetermined unit depth Di and the predetermined suspending time Ts until the present depth Dc equals to the predetermined maximum depth Dm and then raise the object 1 up to the surface position. Then the object 1 may be refloated out of the water by a user, who can retrieve the data stored in the object 1.

Figure 9:
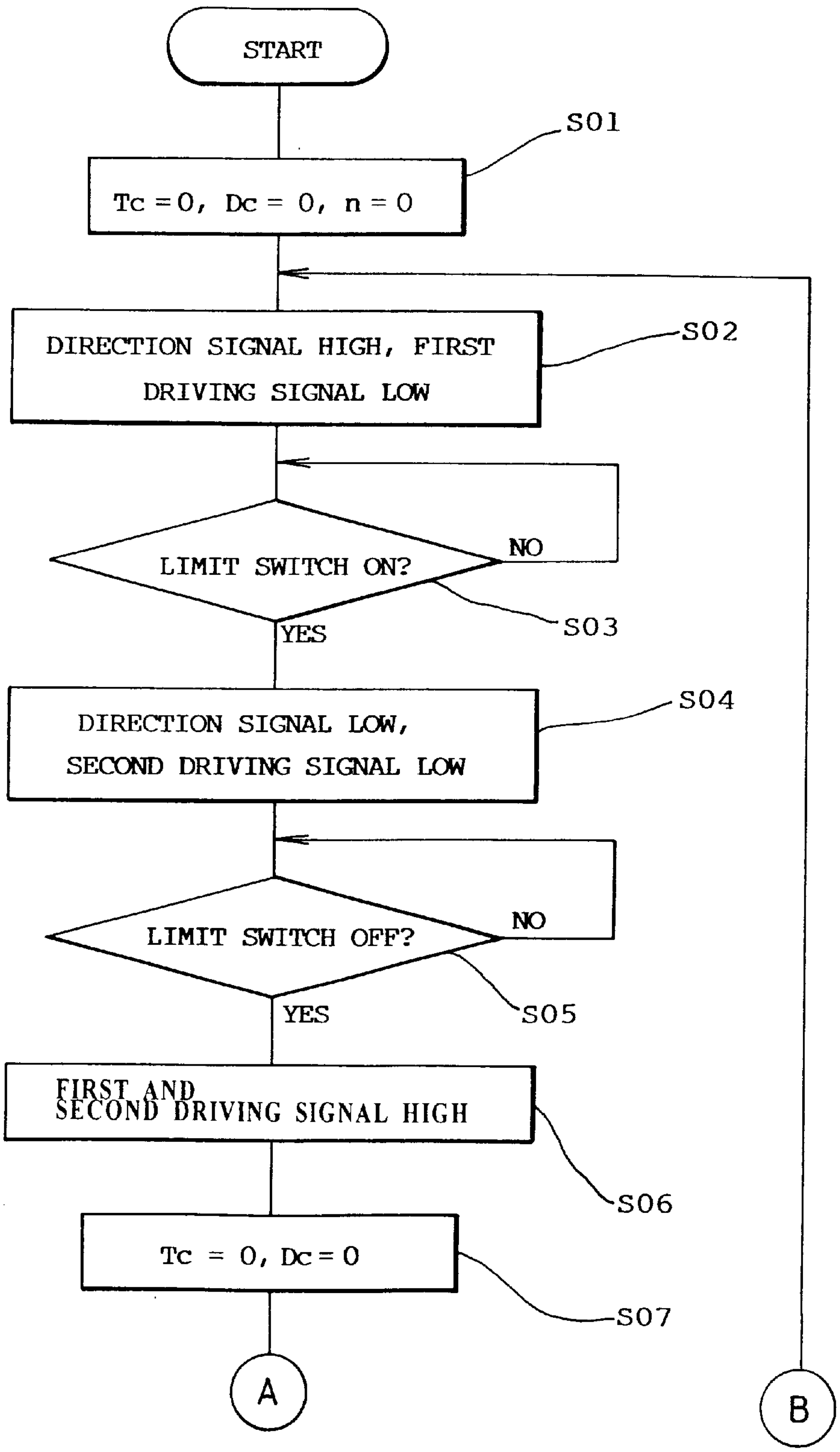
FIGS. 9 to 12 show flowcharts illustrating one embodiment of a control method according to the invention.

In addition to the above steps, an initiating step may be further comprised before the suspending step as shown in FIG. 9. In the initiating step, wherein the values of variables such as Tc and Dc or the like are initiated in the program (S01), the object 1 is raised just below the surface position for preparation (S02 to S06), and values of environment variables are read (S07). The purpose of the initiating step is to initiate the operation of the moving system 10.

In detail with regard to FIG. 9, at first of the program execution, the values of the variables such as the reference time Tc, the present depth Dc, and etc., are set by zero or reference value (S01). Then the motor 15 is activated to rotate in the backward direction (S02) until the limit switch 19 is switched on (S03). The CPU 42, referring to circuits shown in FIG. 7, outputs a direction signal of HIGH to the direction control means 49*b* and a first driving signal of LOW to the driving control means 48*a* via line L3. Then, the first and second backward switching means FET1 and FET4 and the first driving switching means FET6 are turned on and first and second forward switching means FET2 and FET3 and the transistor Q5 are turned off, thus the motor 15 is running in the backward direction and the object 1 is raised up.

Once the limit switch 19 is operated (S03), the first driving switching means FET6 is turned off regardless the first driving signal of LOW, and the CPU 42 outputs a direction signal of LOW to the direction control means 49*b* and a second driving signal of LOW to the driving control means 48*a* via line L2. Then, the first and second backward switching means FET1 and FET4 and the first driving switching means FET6 are turned off and the first and second forward switching means FET2 and FET3 and the second driving switching means FET5 are turned on, thus the motor 15 is running in the forward direction and the object 1 is lowered down (S04) until the limit switch 19 is switched off (S05). When the limit switch 19 is switched off (S05), the CPU 42 outputs the first and the second driving signals of HIGH in order to deactivate the motor 15 to stop rotating and suspend the object 1 just under the surface position (S06).

Next, the values of the present depth Dc and the reference time Tc is re-initiated by a zero (S07). Finally, the CPU 42 reads values of environment variables such as the predetermined unit depth interval Di, the predetermined unit time interval Ti and the predetermined maximum depth Dm which are stored in associated memory means (S08). Then, the foregoing suspending step is executed (S09).

Figure 10:
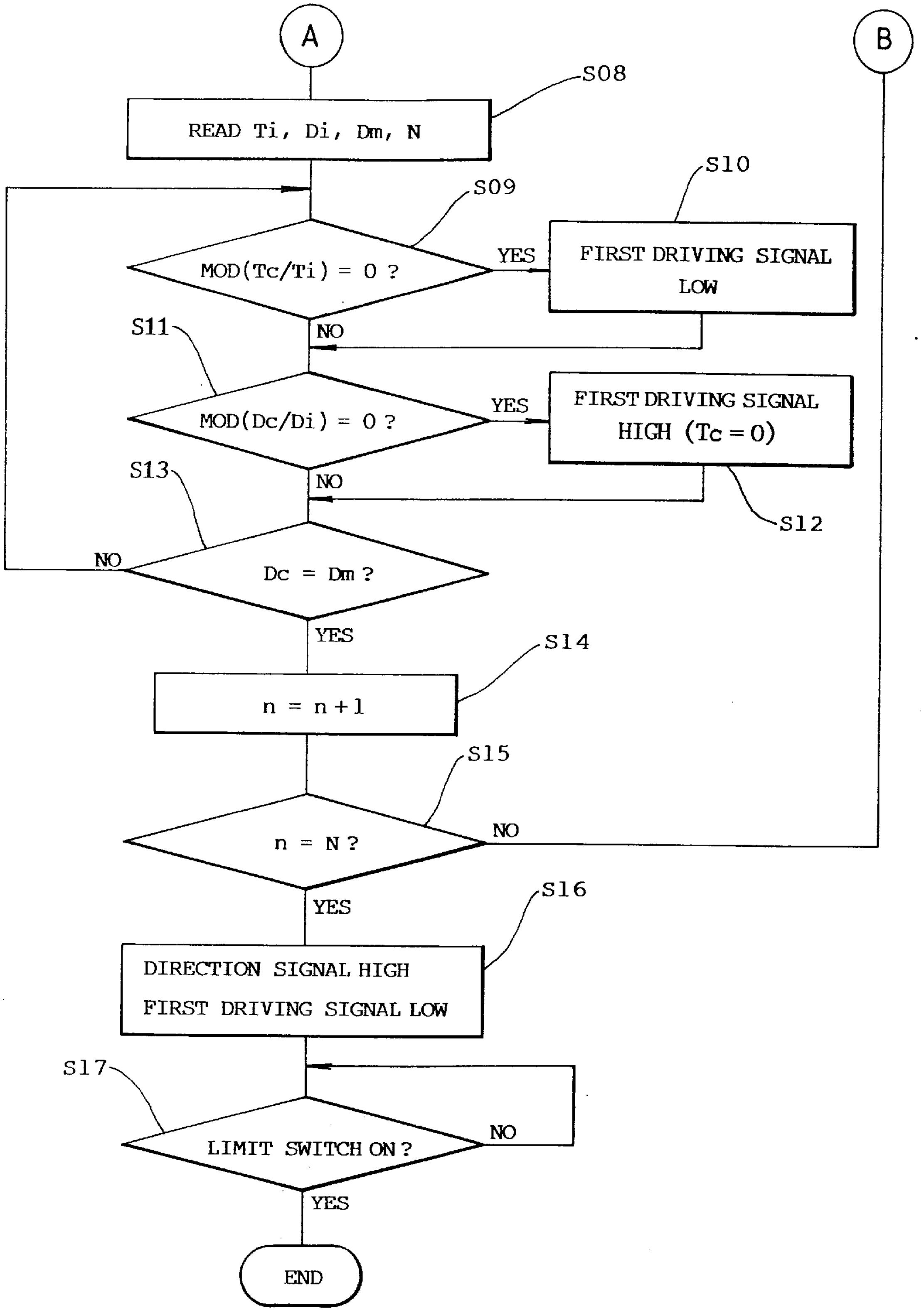

Furthermore, in addition to the above steps, a second repeating step may be comprised after the foregoing returning step, for repeatedly executing the suspending step to the returning step. Thus, the object 1 can be automatically and repeatedly moved down and up between the predetermined maximum depth Dm and the surface position in the water with the predetermined depth and time intervals Di and Ts (Ti) during the lowering until the power supply is shut off. The steps S01 to S13 in FIGS. 9 and 10 are similarly executed in FIGS. 13 to 18, wherein the same or similar reference characters denote the same or similar step. Therefore, the detailed description of the same or similar steps will be omitted with regard to FIGS. 13 to 18.

Also, in FIG. 10, the times of execution of the second repeating step may be limited by an integral number N which is selectable by a user and stored in the program. In this case, the control method further comprises such steps that a counting variable n (integral) is increased by 1 (S14) and compared with N (S15) before the returning step is executed as shown in FIG. 10. If n is not identical with N, the foregoing second repeating step is executed, and if n is identical with N, then the motor 15 is activated to rotate in the backward direction for raising up the object 1 to the surface position (S16) until the detecting means is operated to deactivate the motor 15 (S17). Then, the program may be ended.

Figure 13:
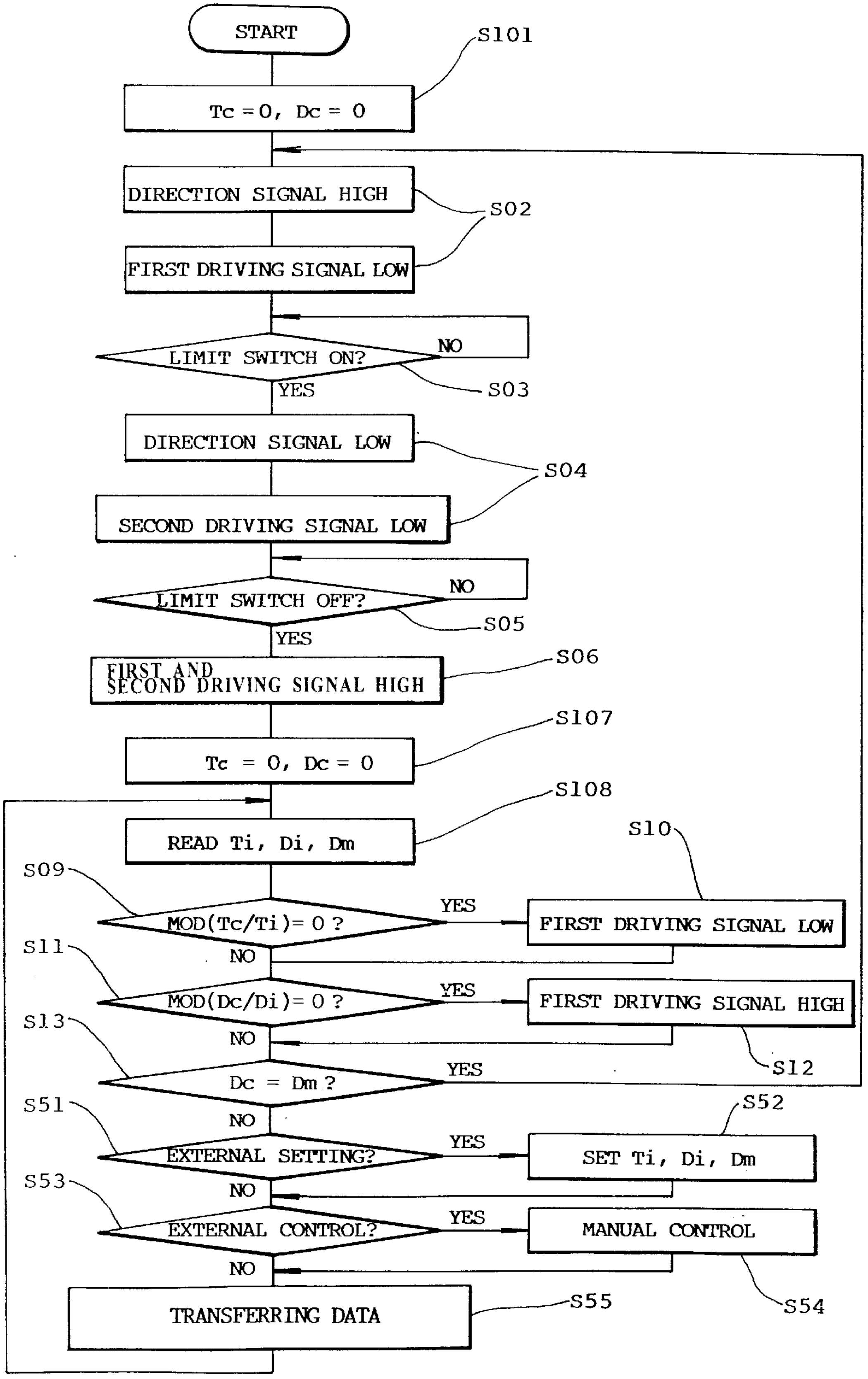
FIG. 13 shows a flowchart illustrating another embodiment of a control method according to the invention.

Still another control method is illustrated in FIG. 13 as a flow chart according to the present invention, which, in addition to the above steps, further comprises an external setting step (S51 and S52) for setting or modifying the values of environment variables from the input means and an external control step for controlling the motor 15 manually (S53 to S55). In step S13, if the present depth Dc equals to the predetermined maximum depth Dm, then the returning step is executed, otherwise, before the execution of the first repeating step, an input of an external setting signal from the input means 52 (referred to FIG. 6) is watched (S51). In response to the external setting signal, the values of environment variables such as the predetermined unit time interval Ti, the predetermined unit depth interval Di and the predetermined maximum depth Dm can be set or modified from the input means 52 (S52) and displayed on an external display means 54 or transferred to external memory means (S55).

And In the external control step, an input of external control signals from the input means 52 for manual control is watched (S53) and the motor 15 can be controlled in operation and direction in response to the external control signals (S54). Thus, the moving system 10 is controlled by an external control system such as a notebook computer having the input means 52 and the display means 54.

Figure 14:
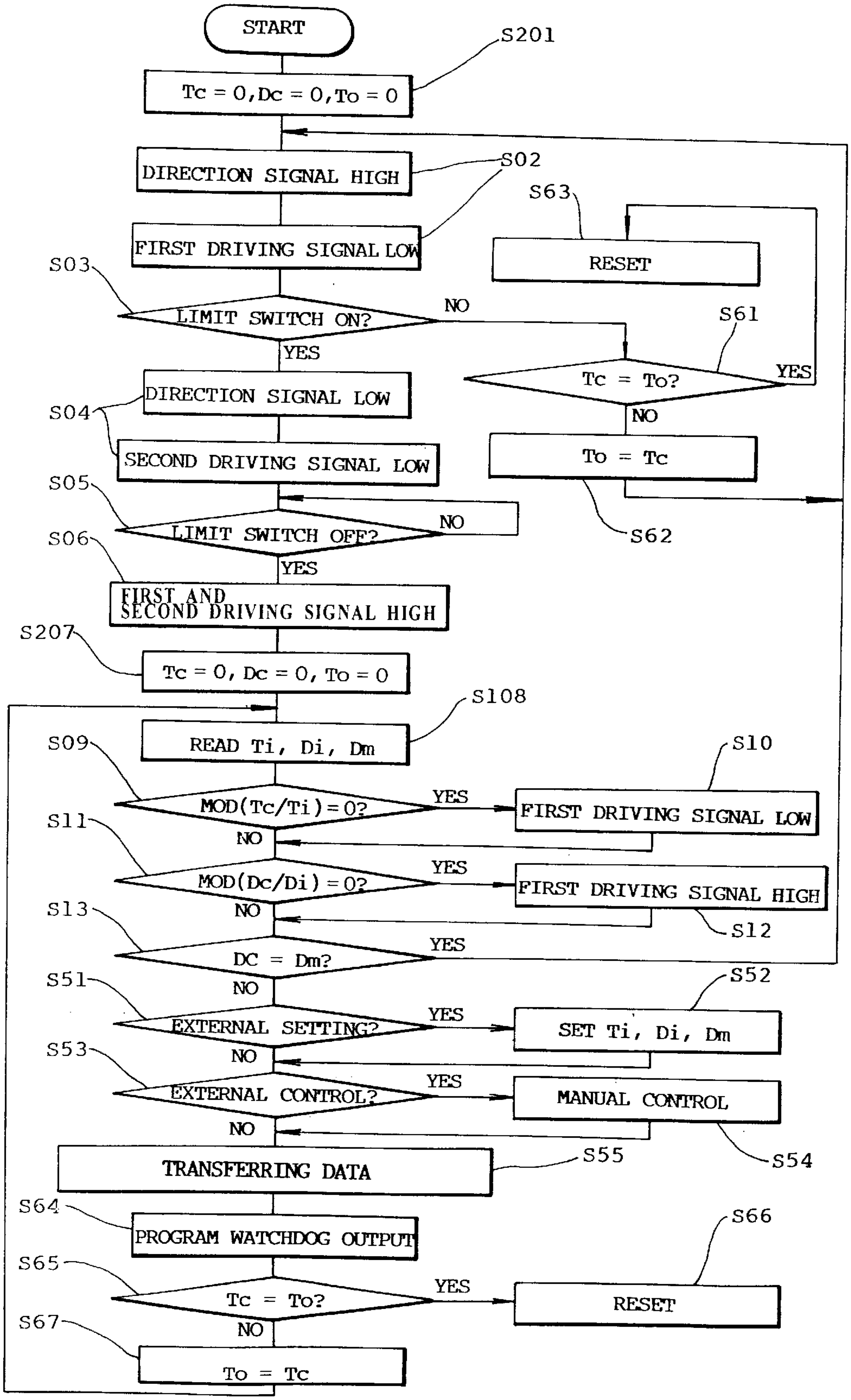
FIG. 14 shows a flowchart illustrating still another embodiment of a control method according to the invention.

Referring to FIG. 14 illustrating still another control method as a flow chart according to the present invention, the method may further comprise a timer error supervisory step (S61 to S63, S65 to S67) in addition to the above steps. In this case, the operation of the internal timer may be supervised in the program. An old time To is set by zero at the initiating step (S201 or S207). When the limit switch is switched off during the raising of the object 1 (S03) or when the object 1 is being lowered down, the reference time Tc acquired from the internal timer is compared with the old time To (S61 or S65). When Tc is equal to To, it is determined that the internal timer is not operated and some errors occur in the internal timer. Then, the control system is reset (S63 or S66) and the operation of the moving system may be restarted. When the reference time Tc is not equal to the old time To, then the operation of the internal timer is determined as normal, and the old time To is replaced with the reference time Tc (S62 or S67).

Meanwhile, in step S64 in FIG. 14, the program watchdog signal is periodically outputted to the program watch means 62 for resetting the program when some error occurs in the execution of the program.

Figure 15:
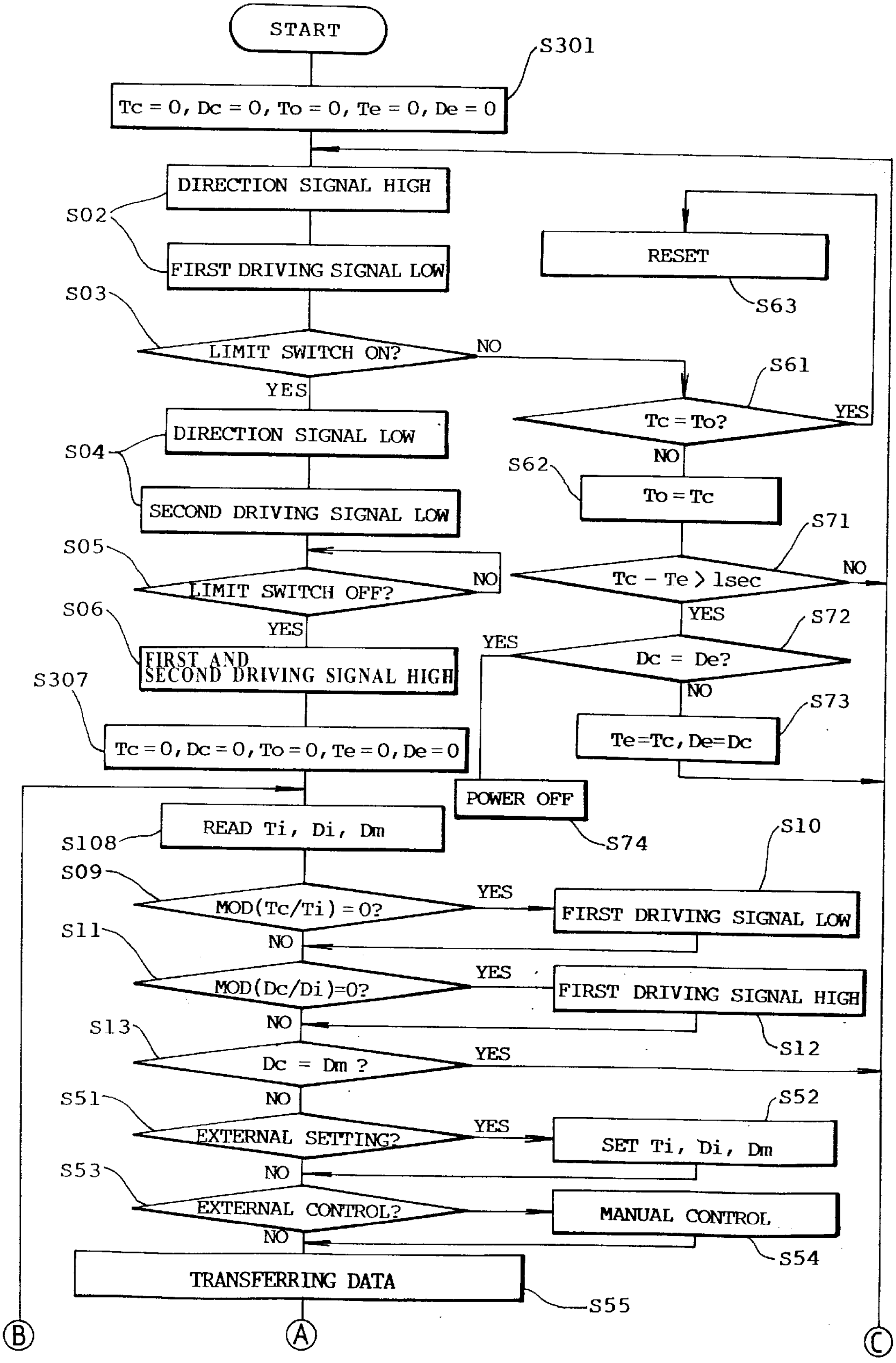
FIGS. 15 and 16 show flowcharts illustrating still another embodiment of a control method according to the invention.
Figure 16:
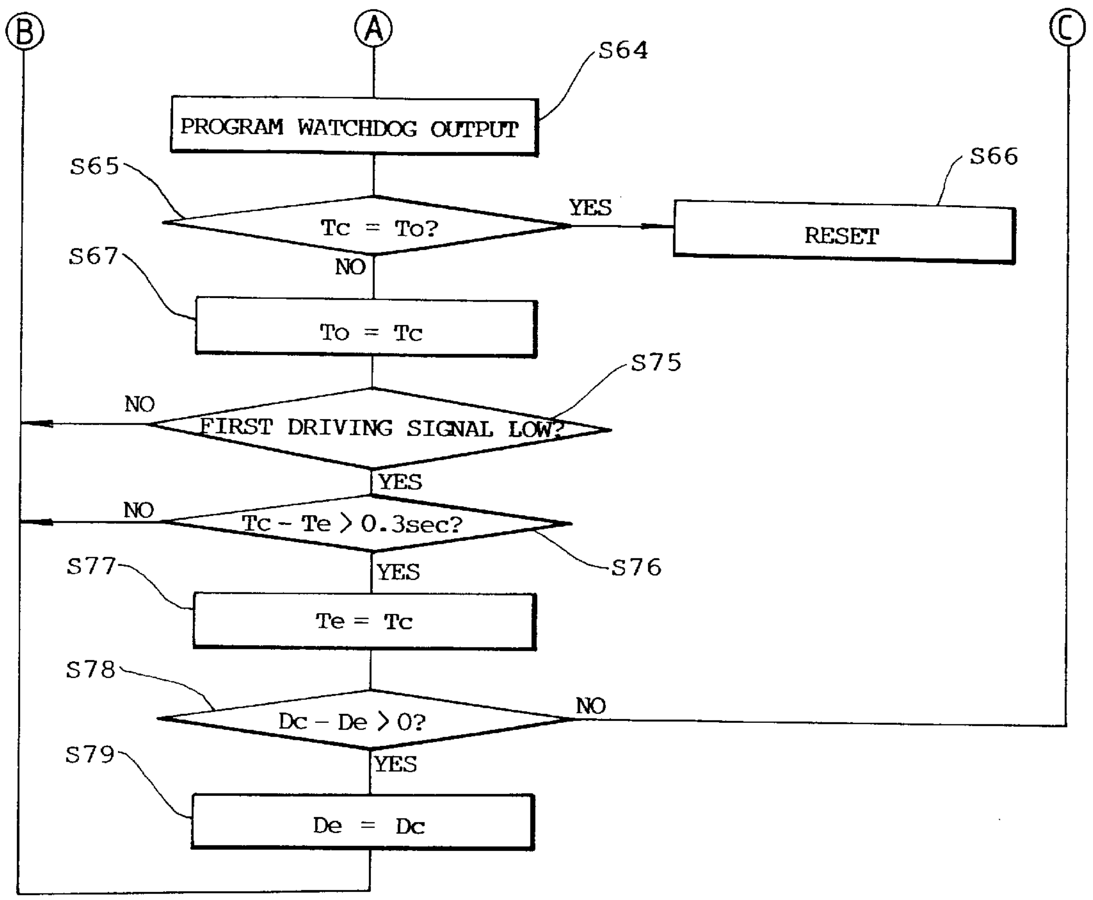

As shown in FIGS. 15 and 16 illustrating still another embodiment of the control method according to the present invention, the program executed by the control system may further comprise an encoder error supervisory step (S71 to S74, S75 to S79) in addition to the above steps, wherein the operation of the rotary encoder 16' is supervised by the CPU 42. An encoder check time Te and an encoder check depth De respectively set to zero in step S301. When the object 1 is being raised after the operation of the internal timer has been determined as normal in the timer error supervisory step (S61 and S62), the encoder check time Te is compared with the reference time Tc (S71) respectively. If Tc is greater than Te by 1 second (YES at S71), the present depth Dc acquired from the rotary encoder 16' is compared with the encoder check depth De (S72). If De is not equal to Dc, the operation of the encoder 16' is determined as normal. Then in order to use in subsequent supervisory step, the values of Te and De are replaced with the values of Tc and Dc (S73). However, if Dc is equal to De (YES at S72), then the encoder's operation is determined as abnormal. That is, although the motor 15 has controlled to raise the object 1 for 1 second and more, the wire rope 12, the guide roller 17, and/or the encoder 16' are not operated in the raising direction and some errors are determined to be occurred such entanglement of the wire rope 12, misworking of the elements, being immobilizwd by uncertain matters drifted in the water, etc. Accordingly, in order to protect the object 1 and the moving system 10 the power supply is shut off (S74).

Also, such encoder error supervisory step may be employed while the object 1 is being lowered. At first, the values of Tc, Dc, Te, and De are set to zero (S307) after the operation of the timer is determined as normal (S65 and S67) and it is determined whether the object 1 is being lowered (S75). If the object 1 is being lowered (YES at S75), it is determined whether Tc is greater than Te by 0.3 seconds, that is, whether the motor 15 has been rotated in the forward direction for lowering the object 1 for 0.3 seconds and more (S76). If Tc is greater than Te by 0.3 seconds or more, Dc is compared with De (S78). If Dc is greater than De (YES at S78), then the encoder's operation is determined as normal. So the values of Te and De are replaced with the values of Tc and Dc respectively in order to be used in the subsequent supervisory step (S77 and S79). However, if Dc is not greater than De (NO at S78), the encoder's operation is abnormal. So the control system may control the motor 15 to be rotated for raising the object 1 (returning to S02) and restart the overall operation of the moving system 10. Alternatively, the control system may be shut off as in the foregoing embodiment so as to stop the operation of the moving system 10.

Figure 17:
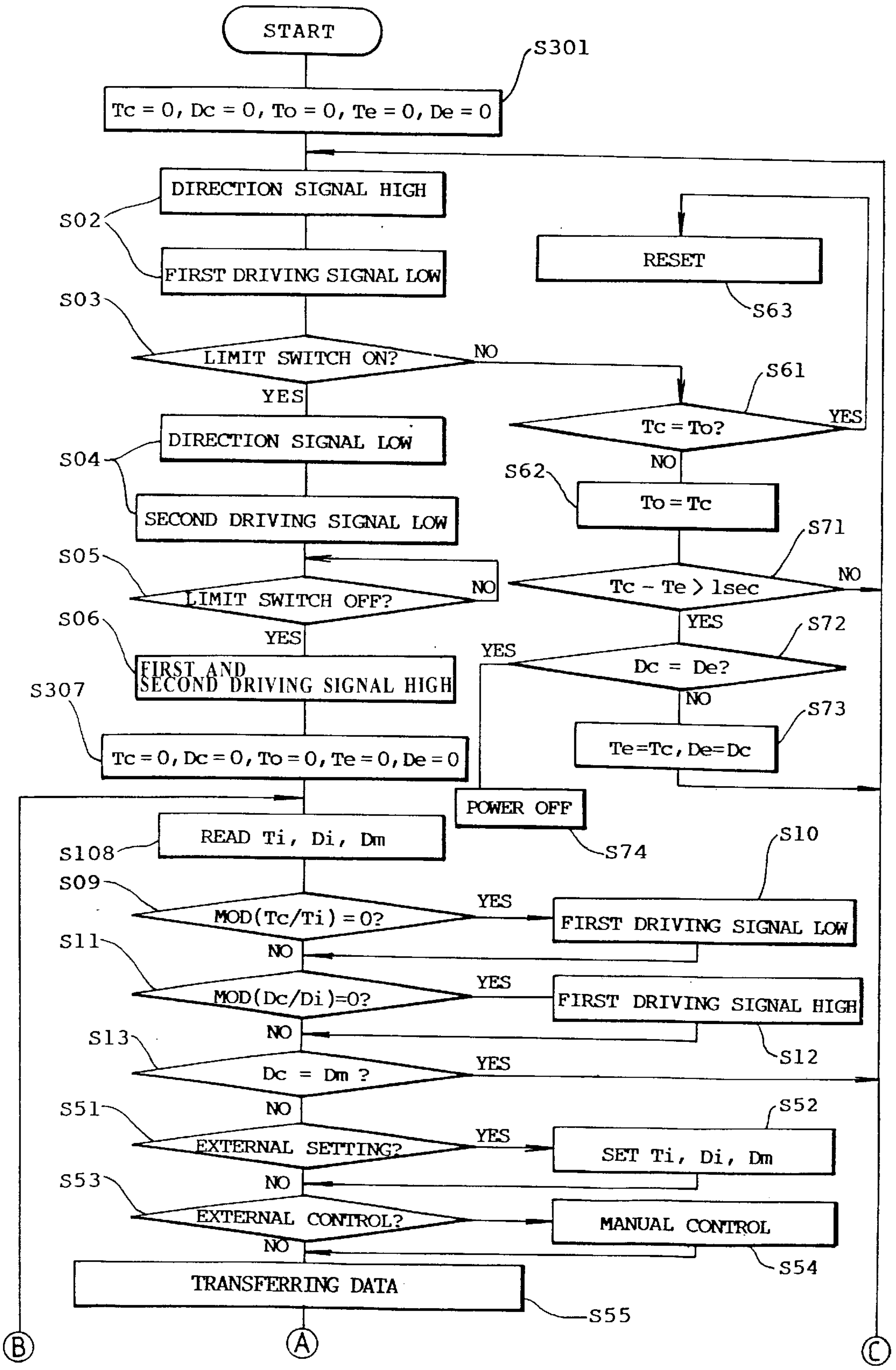
FIGS. 17 and 18 show flowcharts illustrating still another embodiment of a control method according to the invention.
Figure 18:
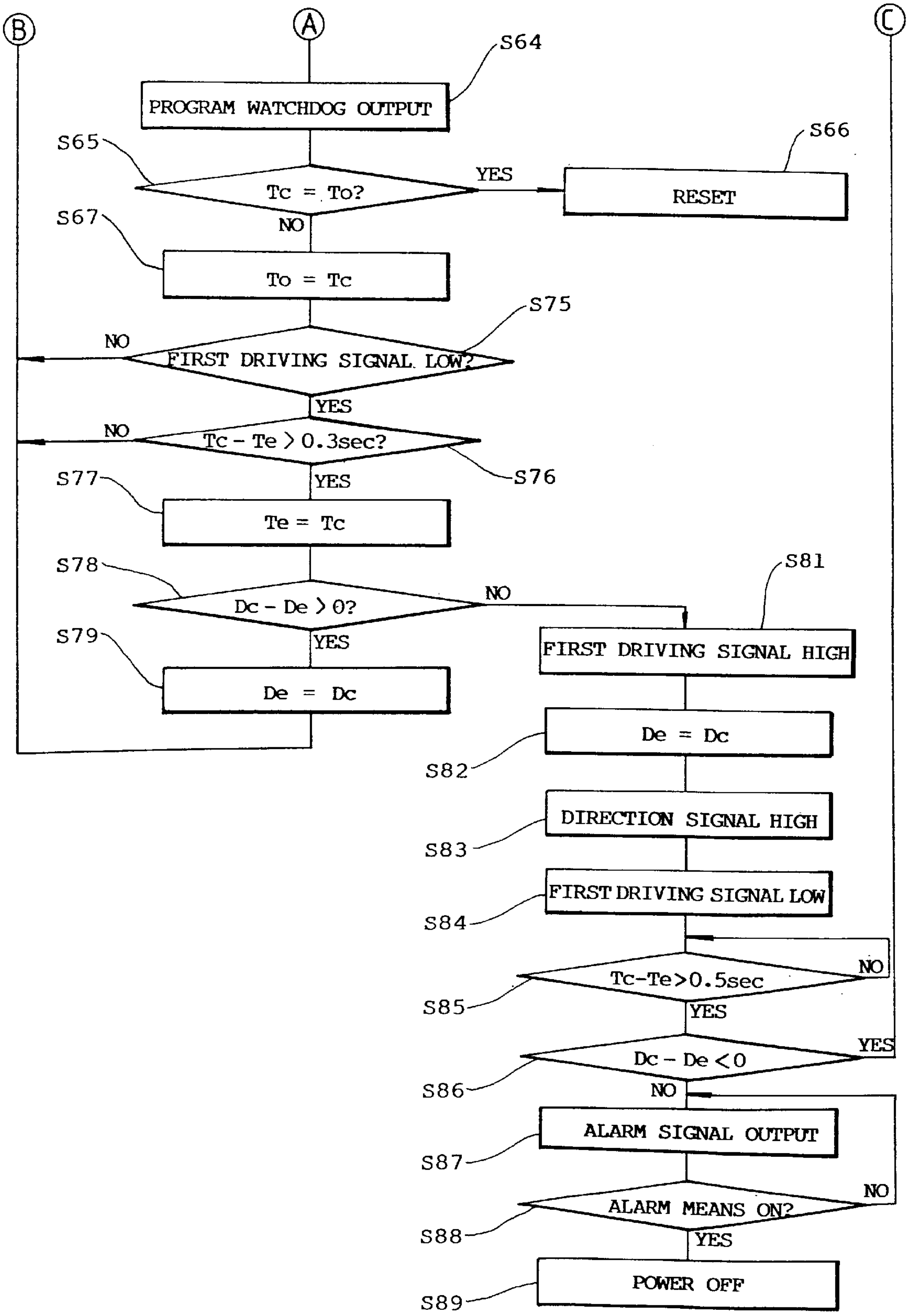

And, as shown in FIGS. 17 and 18 illustrating another embodiment of the control method according to the present invention as a flow chart, the method may further comprise a missing supervisory step (S81 to S89) in addition to the above steps. In this case, missing of the object 1 may be supervised by the CPU 42. For example, when the present depth Dc is equal to, or less than, the encoder check depth De during the lowering in the encoder error supervisory step (S78), the motor 15 is deactivated (S81) and the encoder check depth De is replaced with the present depth Dc (S82) instead of breaking the electric power supply and/or raising the object 1 to the surface position in the foregoing embodiment. And the motor 15 is activated to rotate in the backward direction for raising the object 1 for a seconds (S83, S84 and S85). After the predetermined missing check time elapsed (YES at S85), the present depth Dc is compared with the encoder check depth De (S86). If the present depth Dc is smaller than the encoder check depth De (YES at S86), the raising operation of the object 1 is determined as normal and the motor 15 is continuously activated to rotate in the backward direction for raising the object 1 to the surface position (returning to S02).

However, if the present depth Dc is equal to, or greater than the encoder check depth De (NO at S86), the raising operation of the object 1 is determined as abnormal, that is, the object 1 is determined to be raised normally or not to be engaged at the wire rope 12 anymore, thus an alarm signal is outputted (S87) to an internal alarm means 72 and/or an external alarm means 78 supplied by a separated electric power source. Then, the electric power supply for the control system may be shut off (S88 and S89). In order to output the alarm signal to the external alarm means 78, a wireless transmitter 74 and receiver 76 are employed (as shown briefly in FIG. 6).

As it is clear from the above, by using the moving system in accordance with the present invention, an object such as an automatic water analysis device which automatically analyzes the water quality and stores the resultant data may be vertically moved in water in order to analyze the vertical changes of the water quality in the water continuously, thereby making it possible to easily acquire sufficient data to develop water quality management alternatives especially in lakes and reservoirs.

The moving system according to the present invention is automatically recovered by a reset signal caused from hardware or software when errors generate in execution of the program so that the moving system can be run automatically.

Moreover, when repeated reset operations are executed by a fatal error in the moving system, electric power supply is shut off to stop and protect the moving system. And the moving system according to the present invention can be automatically protected by raising the device or shutting off electric power supply when mis-working causes from outside or inside of the moving system such as mis-working of motor, entangled wire rope, or immobilization of wire rope due to unusual drifting matters in water.

Also, the moving system can be protected by using additional line and weight from wire rope being cut off, which may result in the loss of water quality sensors attached to the wire rope.

Having thus considered the basic concept of the invention, it will be readily apparent to those skilled in the art that the foregoing detailed disclosure is intended to be presented by way of examples only and is not limiting. Various alterations, improvements, and modifications will occur to those skilled in the art, though not expressly stated herein. These modifications, alterations and improvements are intended to be covered hereby, and are within the spirit and scope of the invention.

What is claimed is:

1. An automatic vertical moving system for vertically moving an object in order to analyze water quality continuously and monitor the vertical change of water quality, the moving system comprising:

a floating means for floating on the surface of water so as to be retained at a desired position thereon;

a winch means mounted on the floating means, rotatable in opposite directions to lower and raise the object, and provided with a wire rope to be wound or rewound around the winch means according to the rotational directions thereof, the wire rope being connected at its free end to the object; and a forward-and-backward rotation means for rotating the winch means between a forward direction to lower the object and a backward direction to raise the object, said forward-and-backward rotation means including (a) an electric motor connected to the winch means which rotates in opposite directions, (b) an electric power supply means for supplying electricity, and (c) a motor control means for controlling the motor to be regularly activated or deactivated and to be changed in the rotational directions thereof, wherein said motor control means includes a driving control means for switching the electric power supply means to the motor on and off, a timer means connected to the driving control means for switching the electric power supply means to the motor on to activate the motor at predetermined suspending time intervals whenever the motor is deactivated, a plurality of guide rollers for guiding the wire rope to be wound or rewound steadily and for providing tension on the wire rope so that one of the guide rollers can not be rotated when the wire rope is loosened during the lowering, a counter means coupling with the one guide roller for detecting a rotational displacement thereof, and electrically connected to the driving control means for switching the motor off to deactivate the motor whenever the rotational displacement of the counter means is equal to a multiple of a predetermined rotational displacement interval corresponding to a predetermined unit depth during the lowering of the object and whenever the counter means is reset due to the raising of the object, and a direction control means connected to the counter means for converting the rotational direction of the motor when the rotational displacement of the counter means is not changed during the lowering of the object thereby raising the object, and when the counter means is reset thereby being capable of lowering the object after the predetermined suspending time by means of the timer means.

2. The moving system according to claim 1:

wherein the plurality of guide rollers are mounted on the floating means and provide tension on the wire rope so that one of the guide rollers cannot be rotated when the wire rope is loosened due to the object's stop during the lowering; and wherein the motor control means further includes a detecting means for detecting the object when the object is raised to a predetermined level near the surface of the water, said detecting means comprising a limit switch mounted on the floating means, connected to the driving control means for switching the motor off to deactivate the motor and connected to the direction control means so as to convert the rotational direction of the motor, thereby being capable of lowering the object after the predetermined suspending time by means of the timer means, and an operating means fixed on the wire rope at a predetermined position near its free end to operate the limit switch when the object is raised to the predetermined level.

3. An automatic vertical moving system for vertically moving an object in order to analyze water quality continuously and monitor the vertical change of water quality, the moving system comprising:

a floating means for floating on the surface of water so as to be retained at a desired position thereon;

a winch means mounted on the floating means, rotatable in opposite directions to lower and raise the object, and provided with a wire rope to be wound or rewound around the winch means according to the rotational directions thereof, the wire rope being connected at its free end to the object; and a forward-and-backward rotation means for rotating the winch means between a forward direction to lower the object and a backward direction to raise the object, said forward-and-backward rotation means including (a) an electric motor connected to the winch means for rotating in opposite directions, (b) an electric power supply means for supplying electricity, and (c) a motor control means for controlling the motor to be regularly activated and deactivated, and to be changed in the rotational directions thereof, said motor control means having a driving control means for switching the electric power supply means to the motor on and off, a direction control means for converting the rotational direction of the motor, and a control system connected to the driving control means for switching the electric power supply means to the motor off at predetermined depth time intervals corresponding to the predetermined unit depth and for switching the electric power supply means to the motor on at predetermined suspending time intervals and connected to the direction control means for converting the rotational direction of the motor at a predetermined entire lowering time Td and at a predetermined pure raising time Tr, thereby repeatedly lowering and raising the object within a maximum depth to be converted substantially from the predetermined pure raising time Tr and a rotational speed of the motor.

4. The moving system according to claim 3:

wherein the driving control means includes a first driving switching means for switching the electric power supply means to the motor on and off, so that the motor is activated when the first driving switching means is switched on, and so that the motor is deactivated when the first driving switching means is switched off;

wherein the direction control means comprises a first and a second forward switching means and a first and a second backward switching means for switching the connection of the electric power supply means to the motor selectively between a first terminal and a second terminal of the motor so that the motor may be rotatable in the forward direction when the first and the second forward switching means are switched on and the motor may be rotatable in the backward direction when the first and the second backward switching means are switched on, and a first direction switching means and a second direction switching means for switching the first and second forward switching means and the first and second backward switching means on/off respectively and connected to each other in a manner interlocked to be switched on alternatively, thereby the first and the second forward switching means and the first and the second backward switching means being interlocked to be switched on alternatively; and wherein the control system further comprises:

a central processor processing interrupted signals from an internal timer to acquire data of a reference time Tc, executing a program to establish predetermined controls, and outputting a plurality of control signals to the driving and direction control means, the control signals comprising a first driving signal of HIGH/LOW for switching on/off the first driving switching means of the driving control means and a direction signal of HIGH/LOW for switching one of the first direction switching means and the second direction switching means on/off; and memory means storing the program for establishing predetermined controls and data generated during the execution of the program.

5. The moving system according to claim 4, the control signals being characterized in that:

the first driving switching means is switched on and the motor is activated when the first driving signal is LOW, thereby deactivating the motor by a HIGH signal generated from the central processor at the outset of the application of the electric power; and the motor is able to rotate in the backward direction via the direction control means when the first direction signal is HIGH, thereby being capable of rotating the motor in the backward direction and raising the object by a HIGH signal generated from the central processor at the outset of the application of the electric power.

6. The moving system according to claim 4, further comprising:

a plurality of guide rollers mounted on the floating means for guiding the wire rope to be wound or rewound steadily and for providing tension on the wire rope so that one of the guide rollers can not be rotated when the wire rope is loosened during the lowering; and a rotary encoder coupled with the one rotating guide roller for outputting electric signals corresponding to the rotation displacement thereof so that the central processor calculates a present depth Dc of the object in the water, switches the motor off to deactivate the motor through the driving control means whenever the present depth Dc equals to a multiple of a predetermined unit depth Di instead of switching the electric power supply means to the motor off at the predetermined depth time intervals, and converts the rotational direction of the motor through the direction control means when the electric signals are not outputted from the encoder during the lowering of the object and when the present depth Dc becomes a zero during the raising instead of converting the rotational direction of the motor at the predetermined entire lowering time and the predetermined pure raising time, thereby iterating the lowering with the predetermined depth and suspending time intervals and the continuous raising of the object by means of using the electric signals from the encoder.

7. The moving system according to claim 4, further comprising a detecting means for detecting that the object is at a predetermined level near the surface of the water, the detecting means comprising:

a limit switch mounted on the floating means, connected to the first driving switching means for switching the first driving switching means off when operated, thereby deactivating the motor regardless of the first driving signal, and connected to the central processor for inputting a signal indicating the on/off status of the limit switch; and an operating means fixed on the wire rope at a position near its free end for effecting the limit switch to be switched on when the object is raised to the predetermined level near the surface of the water and to be switched off once the object is lowered down from the predetermined level; and the driving control means further comprising a second driving switching means connected to the motor parallel with the first driving switching means so as to activate and deactivate the motor regardless of the first driving switching means;

wherein the central processor outputs a second driving signal to the second driving switching means for activating the motor, and the direction signal to the first direction switching means for converting the rotational direction of the motor at the predetermined level near the surface of the water instead of converting the rotational direction of the motor at predetermined pure raising time intervals during the raising.

8. The moving system according to claim 4, further comprising:

a plurality of guide rollers for guiding the wire rope to be wound or rewound steadily and for providing tension on the wire rope so that one of the guide rollers can not be rotated when the wire rope is loosened due to the object's stop during the lowering; and a rotary encoder coupled with the one rotating guide roller for outputting electric signals corresponding to the rotational displacement thereof so that the central processor calculates a present depth Dc of the object in the water during the lowering, switches the motor off to deactivate the motor through the driving control means whenever the present depth Dc equals to a multiple of a predetermined unit depth Di instead of switching the electric power supply means to the motor off at the predetermined depth time intervals, and converts the rotational direction of the motor through the direction control means when the electric signals are not outputted from the encoder during the lowering of the object instead of converting the rotational direction of the motor at the predetermined entire lowering time interval during the lowering; and a detecting means for detecting that the object is at a predetermined level near the surface of the water, the detecting means comprising:

a limit switch mounted on the floating means, connected to the first driving switching means for switching the first driving switching means off when operated, thereby deactivating the motor regardless of the first driving signal, and connected to the central processor for inputting a signal indicating the on/off status of the limit switch;

an operating means fixed on the wire rope at a position near its free end for effecting the limit switch to be switched on when the object is raised to the predetermined level near the surface of the water and to be switched off when the object is lowered down from the predetermined level; and the driving control means further comprising a second driving switching means connected to the motor parallel with the first driving switching means so as to activate and deactivate the motor regardless of the first driving switching means;

wherein the central processor outputs a second driving signal to the second driving switching means for activating the motor when the first driving switching means is switched off by means of the limit switch at the predetermined level, and the direction signal to the direction control means for converting the rotational direction of the motor at the predetermined level near the surface of the water instead of converting the rotational direction of the motor at a predetermined pure raising time Tr during the raising, thereby repeatedly and regularly lowering and raising the object by using the electric signals from the encoder and the limit switch.

9. The moving system according to claim 4, further comprising:

a reset means connected to the central processor to generate a reset signal to the central processor for automatically initiating the program when the reset means is enabled; and a program watch means connected to the central processor for supervising whether the central processor is operating normally by detecting a watchdog signal from the central processor by every predetermined time period, and connected to the reset means for enabling the reset means when the watchdog signal is not detected.

10. The moving system according to claim 9, further comprising a guarding device provided in a supply passageway through which the electric power is supplied to the overall system from the electric power supply means and connected to the reset means for breaking the supply passageway when the reset signals are generated continuously or consecutively in more than a predetermined number of times, said guarding device comprising:

a first guarding switching means connected to the reset means to be operable by means of the reset signal so as to output an amount of electric voltage;

a capacitor to be charged by means of the outputting electric voltage;

a resistor connected to the capacitor for discharging the charge of the capacitor;

a second guarding switching means connected to the capacitor for being switched on when the voltage of the capacitor is charged over a predetermined voltage by means of reset signals generated more frequently than the predetermined number of times;

a first electromagnetic relay having a first solenoid coil energized when the second guarding switching means is switched on and a first changeover switching means is switched supply passageway on when the first solenoid is deenergized and breaks the supply passageway when the first solenoid is energized;

a second electromagnetic relay having a second solenoid coil energized when the first changeover switching means switched the supply passage on and a second changeover switching means which switches the supply passageway off when said second solenoid coil is deenergized, thereby said second solenoid coil being maintained in the deenergized state once the first changeover switching means switches the supply passage off; and a start switch for energizing the second solenoid coil when the second solenoid coil is deenergized and the second changeover switching means switches the supply passageway off, thereby enabling to restart the overall system after the supply passageway is broken, wherein the guarding device is provided in the supply passageway of the overall system, and the guarding device is connected to the reset means for operating to effect the supply passageway being broken by means of the reset means enabled in more than the predetermined number of times.

11. The moving system according to claim 4, further comprising:

an input means connected to the control system for manually inputting predetermined external control signals and/or data to the control system; and a display means connected to the control system for displaying predetermined data transferred from the control system; and wherein the program executed by the central processor of the control system further comprises supervising the external control signals from the input means, transmitting data stored in the memory means according to the external control signals to the display means, and controlling the driving control means and the direction control means through the control system according to the external control signals.

12. The moving system according to claim 3, further comprising:

at least one assistant rope provided between the object and a fixed body, the ground or other firmly fixed floating means in order to prevent the object from missing away in the case that the wire rope is cut; and at least one weight means movably and slidably suspended through a ring to the assistant rope.

13. A control method of an automatic vertical moving system for vertically lowering and raising an object such as an automatic water quality analysis system, wherein the moving system comprises: a floating means for securely floating on the water at a desired position; a winch means mounted on the floating means and provided with a wire rope connected at its free end to the object; a motor for driving the winch means in forward and backward directions selectively; a motor control means for controlling the motor in operation and direction; and a control system for controlling the motor control means, provided with a central processor executing a program and associated memory means storing the program and data generated during the program execution, the method comprising:

(a) a suspending step wherein the motor is maintained in a deactivated state to stop rotating for a predetermined suspending time for suspending the object at its vertical level and analyzing water quality;

(b) a lowering step wherein the motor is activated to rotate in the forward direction for lowering the object in a predetermined depth time corresponding to a predetermined depth;

(c) a first repeating step for repeatedly executing the suspending step (a) and the lowering step (b) for a predetermined entire lowering time corresponding to a time period for which the object reaches a predetermined maximum depth; and (d) a returning step wherein, at the predetermined maximum depth, the motor is activated to rotate in the backward direction for raising up the object to the surface position.

14. The control method according to claim 13, wherein the moving system further comprises a rotary encoder coupled the at least one guide roller for outputting electric signals corresponding to the rotational displacement thereof and a detecting means for detecting the object being at the predetermined level near the surface of the water (that is, a surface position):

wherein the lowering step (b), the motor is maintained in the activated state by a predetermined unit depth interval Di until a present depth Dc obtained from the rotary encoder equals to a multiple of the predetermined unit depth interval Di, and then the motor is deactivated for executing the suspending step (a);

wherein in the first repeating step (c), the suspending step (a) and the lowering step (b) are repeatedly executed until the present depth Dc equals to a predetermined maximum depth Dm;

wherein, in the returning step (d), when the present depth Dc is the predetermined maximum depth Dm, the motor is activated to rotate in the backward direction for raising up the object to the surface position until the detecting means is operated; and wherein the control method further comprises:

(e) an interrupting step wherein, separately from the steps (a) to (d), the processor acquires interruptedly a reference time Tc and the present depth Dc by receiving pulse signals from an internal timer and the rotary encoder.

15. The control method according to claim 14:

wherein said method further comprises:

(f) an initiating step before the suspending step (a) in which the values of variables are initiated in the program, and the motor is activated in the backward direction for raising the object to the surface position when the detecting means does not detect the object;

(g) a second repeating step, after the returning step (d), for repeatedly executing the suspending step (a) and the first returning step (d), thereby automatically iterating the lowering of the object with the predetermined depth and suspending time intervals and the continuous raising of the object in the range of the desired maximum depth;

(h) an external setting step wherein an input of an external setting signal from an input means is watched and the values of environment variables such as the predetermined unit time interval Ti, the predetermined unit depth interval Di and the maximum depth Dm are set or amended from the input means; and (i) an external control step wherein an input of external control signals from the input means is watched and the motor is controlled in operation and direction according to the external control signals;

wherein the initiating step (f) comprises the steps of:

(1) setting the values of the variables of the reference time Tc and the present depth Dc by zero;

(2) activating the motor to rotate in the backward direction until the detecting means is switched on, and then, once the detecting means is switched on, the motor is activated to rotate in the forward direction until the detecting means is switched off for lowering the object just under the surface position, thereby deactivating the motor to stop rotating, and then the values of the present depth Dc and the reference time Tc is re-initiated by a value of zero; and (3) reading predetermined and stored values of environment variables of the predetermined unit depth interval Di, the predetermined unit time interval Ti and the predetermined maximum depth Dm;

wherein the lowering step (b) comprises the steps of:

(4) comparing MOD (Dc/Di) with zero to determine whether the object is lowered by the predetermined unit depth interval Di after starting lowering; and (5) deactivating the motor through the motor control means for executing the suspending step (a) when MOD (Dc/Di) is a zero in step (4) and the reference time Tc is reset by a zero where the predetermined suspending time is given to the predetermined unit time interval Ti; and wherein the suspending step (a) comprises:

(6) comparing MOD (Tc/Ti) with zero to determine whether the predetermined suspending time has passed with the object maintained at the multiple depth of the predetermined unit depth interval Di where the total of the predetermined suspending time and the time corresponding to the predetermined unit depth interval Di is given to the predetermined unit time interval Ti;

(7) comparing the predetermined unit time interval Ti with the reset reference time Tc at the deactivating step (5) to determine whether the predetermined suspending time has passed with the object maintained at the multiple depth of the predetermined unit depth interval Di where the predetermined suspending time is given to the predetermined unit time interval Ti;

(8) activating the motor in the forward direction through the motor control means for executing the lowering step (b) when MOD (Tc/Ti) is a zero in step (6) and when the predetermined unit time interval Ti is the reset reference time Tc in step (7).

16. The control method according to claim 14, further comprising:

(j) a timer error supervisory step wherein an old time To to be set to a value of zero at first and then to be replaced with the reference time Tc is compared with the reference time Tc during the execution of the program, the control system is reset if the reference time Tc is equal to the old time To, and the old time To is replaced with the reference time Tc if the reference time Tc is not equal to the old time To.

17. The control method according to claim 14, further comprising:

(K) an encoder error supervisory step wherein an encoder check time Te and an encoder check depth De to be set to a value of zero at first and then to be replaced with the reference time Tc and the present depth Dc respectively are compared with the reference time Tc and the present depth Dc during the lowering or the raising of the object in a predetermined check time after the setting and the replacing, the electric power supply for the overall moving system is shut off if the present depth Dc is equal to, or greater than, the encoder check depth De during the raising and if the present depth Dc is equal to, or smaller than, the encoder check depth De during the lowering, and the encoder check time Te and the encoder check depth De are replaced with the reference time Tc and the present depth Dc, respectively; and (l) a missing supervisory step wherein, when the present depth Dc is equal to, or smaller than, the encoder check depth De during the lowering in the encoder error supervisory step (k), the encoder check depth De is replaced with the present depth Dc instead of breaking the electric power supply, the motor is activated to rotate in the backward direction for raising the object, the present depth Dc is compared with the encoder check depth De in a predetermined missing check time after the motor is activated to rotate in the backward direction, the motor is continuously activated to rotate in the backward direction for raising the object if the present depth Dc is smaller than the encoder check depth De, and, if the present depth Dc is equal to, or greater than, the encoder check depth De, an alarm signal is outputted to at least one external alarm means supplied by a separated electric power source and then the electric power supply is shut off.

18. An automatic vertical moving system for vertically moving an object in order to analyze water quality continuously and monitor the vertical change of water quality, the moving system comprising:

a floating means for floating on the surface of water so as to be retained at a desired position thereon;

a winch means mounted on the floating means, rotatable in opposite directions to lower and raise the object, and provide with a wire rope to be wound or rewound around the winch means according to the rotational directions thereof, the wire rope being connected at its free end to the object;

a forward-and-backward rotation means for rotating the winch means between a forward direction to lower the object and a backward direction to raise the object;

at least one assistant rope provided between the object and a fixed body, the ground or other firmly fixed floating means in order to prevent the object from missing away in the case that the wire rope is cut; and at least one weight means movably and slidably suspended through a ring to the assistant rope.

* * * * *